United States Patent
Cross et al.

(10) Patent No.: US 12,215,263 B2
(45) Date of Patent: Feb. 4, 2025

(54) TRACER COMPOSITION

(71) Applicant: Chelsea Technologies Ltd, Surrey (GB)

(72) Inventors: Jerry Cross, Kent (GB); Charles Whitfield, Kent (GB); John Attridge, Surrey (GB)

(73) Assignee: Chelsea Technologies Ltd, Surrey (GB)

(*) Notice: Subject to any disclaimer, the term of this patent is extended or adjusted under 35 U.S.C. 154(b) by 325 days.

(21) Appl. No.: 17/599,944

(22) PCT Filed: Mar. 26, 2020

(86) PCT No.: PCT/GB2020/050818
§ 371 (c)(1),
(2) Date: Sep. 29, 2021

(87) PCT Pub. No.: WO2020/201724
PCT Pub. Date: Oct. 8, 2020

(65) Prior Publication Data
US 2022/0195292 A1    Jun. 23, 2022

(30) Foreign Application Priority Data
Mar. 29, 2019   (GB) .................................. 1904451

(51) Int. Cl.
*G01N 21/64* (2006.01)
*A01N 25/04* (2006.01)
(Continued)

(52) U.S. Cl.
CPC .............. *C09K 11/06* (2013.01); *A01N 25/04* (2013.01); *C09K 11/025* (2013.01); *G01N 21/6428* (2013.01); *C09K 2211/1018* (2013.01)

(58) Field of Classification Search
CPC .................. C09K 11/06; C09K 11/025; C09K 2211/1018; A01N 25/04; A01N 25/00; G01N 21/6428; G01N 2021/6439
See application file for complete search history.

(56) References Cited

U.S. PATENT DOCUMENTS

| 7,638,335 B2 | 12/2009 | Matsumoto |
| 2004/0040860 A1 | 3/2004 | Foster et al. |

(Continued)

FOREIGN PATENT DOCUMENTS

| AT | 234277 B | 6/1964 |
| CN | 104544132 A | 4/2015 |

(Continued)

OTHER PUBLICATIONS

Csorba, C., et al., "Options for Reduced Volume "Corase" Droplet Spraying", Brighton Crop Protection Conference—Weeds, British Crop Protection Council S.L, GB, Jan. 1, 1995, pp. 513-520, vol. 2.

(Continued)

*Primary Examiner* — David P Porta
*Assistant Examiner* — Mamadou Faye
(74) *Attorney, Agent, or Firm* — Scully, Scott, Murphy & Presser, P.C.

(57) ABSTRACT

The disclosure provides a tracer composition. The composition comprises a fluorescent molecule which fluoresces when exposed to an excitation wavelength, and thereby emit a photon with a wavelength between 400 and 600 nm; and a gelling agent.

18 Claims, 20 Drawing Sheets

(51) Int. Cl.
*C09K 11/02* (2006.01)
*C09K 11/06* (2006.01)

(56) References Cited

U.S. PATENT DOCUMENTS

| | | | |
|---|---|---|---|
| 2006/0065670 A1* | 3/2006 | Doublet | A61J 1/035 206/534 |
| 2006/0225344 A1 | 10/2006 | Van Der Krieken et al. | |
| 2009/0238778 A1 | 9/2009 | Mordas et al. | |
| 2012/0115214 A1* | 5/2012 | Battrell | G01N 21/645 422/82.08 |
| 2016/0290925 A1* | 10/2016 | Takahashi | G01N 33/381 |
| 2017/0064964 A1* | 3/2017 | Bell | A01N 59/00 |
| 2018/0364155 A1 | 12/2018 | Thompson | |
| 2020/0056994 A1* | 2/2020 | Rurack | G01N 33/0057 |
| 2020/0279383 A1* | 9/2020 | Kurtoglu | G01N 21/88 |

FOREIGN PATENT DOCUMENTS

| | | |
|---|---|---|
| CN | 106974265 A | 7/2017 |
| CN | 109293831 A | 2/2019 |
| CN | 109337021 A | 2/2019 |
| CN | 109580565 A | 4/2019 |
| EP | 2056094 A1 | 5/2009 |
| JP | 2002080347 A | 3/2002 |
| JP | 2003073284 A | 3/2003 |
| WO | 2018/213596 A1 | 11/2018 |

OTHER PUBLICATIONS

GB Search Report dated Jan. 27, 2020 issued in GB1904451.0, 4 pages.
International Search Report dated Jul. 6, 2020 issued in PCT/GB2020/050818, 4 pages.
Written Opinion dated Jul. 6, 2020 issued in PCT/GB2020/050818, 6 pages.
Search Report dated Oct. 1, 2019 received in GB Patent Application No. GB1904451.0, 4 pages.
Second Office Action dated Jun. 1, 2024 received in Chinese Patent Application No. 202080030204.3, 18 pages.
Third Office Action dated Oct. 18, 2024 received in Chinese Application No. 202080030204.3, 13 pages.

* cited by examiner

Fig. 2
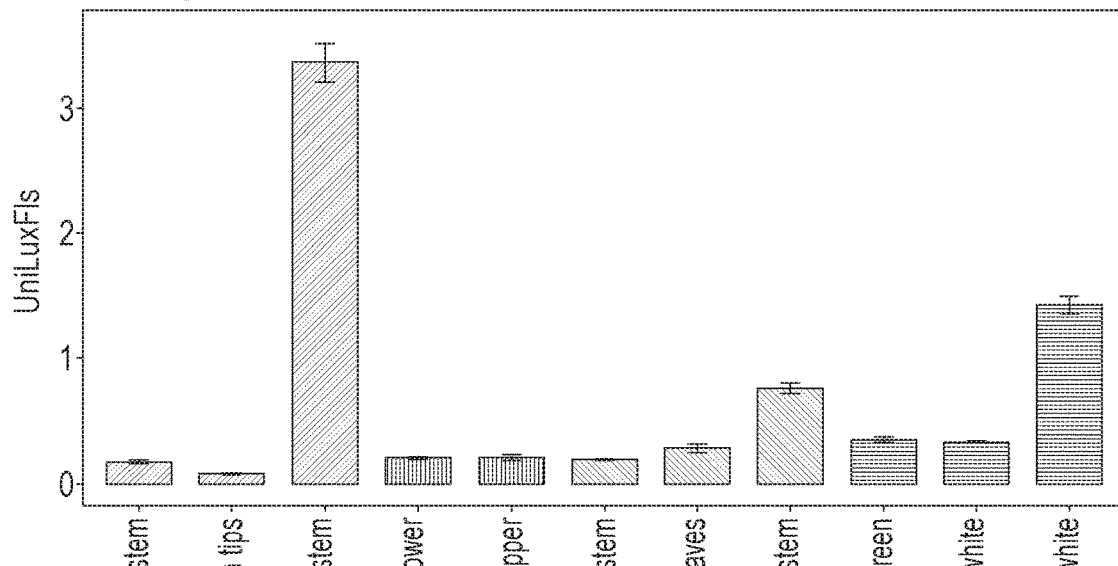
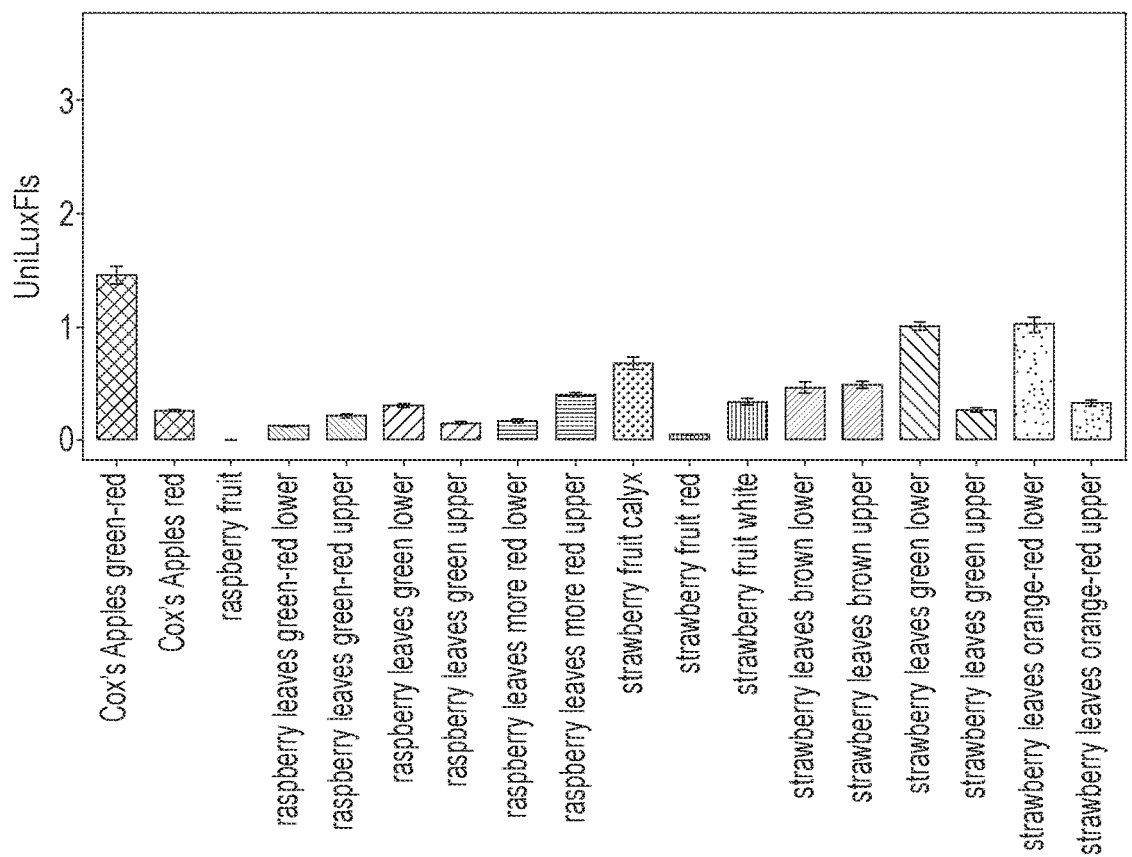

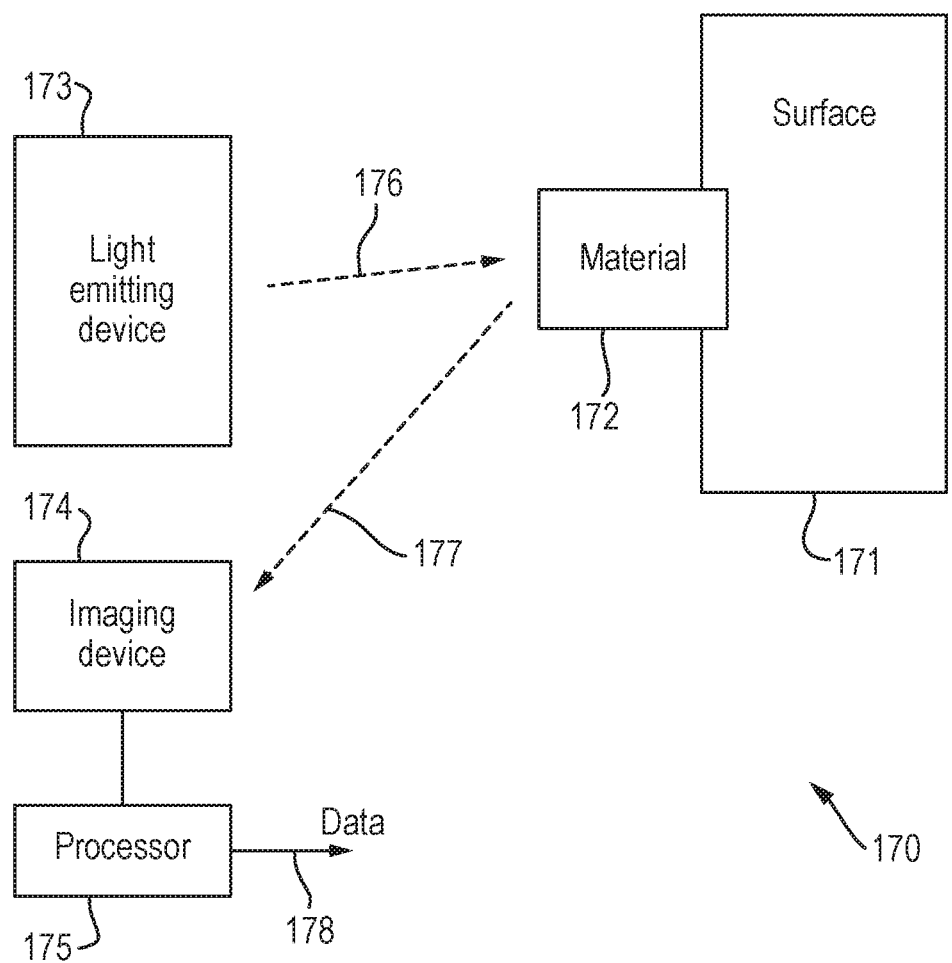

TRACER COMPOSITION

The invention relates to a tracer composition, and more specifically to a tracer composition which may be used to determine spray deposition comprising the composition. The invention also extends to a method of assessing deposition of a spray using the tracer composition.

Sprays are often used in agriculture to treat the surface of plants and soil with pesticides, feeds and other substances. A minimum deposit on the surface is required to be effective. Accordingly, to ensure that the minimum deposit has been obtained, methods have been developed to detect and analysis the extent and thoroughness of spray deposits.

One way of determining coverage is to use water sensitive papers which are distributed amongst crops and which indicate where they have been wetted by the spray. This method has a number of limitations. In particular, the technique is broadly qualitative and gives little indication of the amount of spray on crop leaves. Furthermore, the papers are not deemed to be realistic proxy for leaves. The method requires the water sensitive paper to be dispersed within the crops. In practice, this requires the paper to either be attached directly to the crops or on a supporting structure. This would normally require the paper to be attached by hand, which is time consuming. Finally, the use of water sensitive papers requires completely dry conditions, which drastically effects when they may be used.

Detectable tracers have been developed for crop sprays where the spray includes a visual or fluorescent tracer. One example of a visual tracer is kaolin, which can be added to the spray and leaves a white residue on the surface of the leaves when the spray dries. Spray coverage can then be visually inspected. Alternatively, when fluorescent tracers are added to the spray the coverage can then be assessed in the dark with a UV light. While these methods offer improvements over water sensitive papers, they are still broadly qualitative. Furthermore, the tracers used often are not food safe, which may require the crop to be destroyed.

Another way of assessing crop spray coverage is through laboratory testing. This technique requires spraying crops or artificial targets with a detectable substance, e.g. a detectable pesticide, a colourant, or a fluorescent marker. The deposits can be photographed to allow the cover to be analysed. After that the deposits can be washed off and quantified to determine the amount which has been deposited. This allows various spray techniques to be tested and modified to improve coverage. However, this method is expensive and time consuming. Furthermore, artificial targets may be an unrealistic proxy for leaves whereas any crops used by the laboratory for analysis may need to be destroyed after testing.

The present invention comes from the inventors' work in attempting to overcome the problems associated with the prior art.

In accordance with a first aspect of the invention, there is provided a tracer composition, the composition comprising:
  a fluorescent molecule which fluoresces when exposed to an excitation wavelength, and thereby emit a photon with a wavelength between 400 and 600 nm; and
  a gelling agent.

Advantageously, the tracer composition can be used to assess spray deposition. The term 'spray deposition' may be understood to be a measure of spray coverage over an area, the volume of liquid comprising the spray deposits, the size of spray deposits on the surface and/or distribution of deposits over the area.

For instance, the tracer composition can be added to a spray tank with a plant protection product (PPP), which may be applied to a plant or other structure or substrate. The term Plant Protective Product (PPP) may refer to any substance that may be applied to a plant or other structure or substrate in agriculture. For instance, the PPP may comprise a herbicide, an insecticide, an acaricide, a nematicide, a molluscicide, a bactericide, a fungicide, an adjuvant, a fertiliser, a hormone or an elicitor. The tracer composition allows the percentage coverage and the amount of the PPP which has been deposited on the plant to be ascertained.

Preferably, the fluorescent molecule emits a photon with a wavelength between 450 and 650 nm, more preferably between 475 and 625 nm, and most preferably between 500 and 600 nm. Advantageously, chlorophyll A and chlorophyll B do not absorb or emit photons within this range.

Preferably, the fluorescent molecule fluoresces when exposed to an excitation wavelength between 150 and 700 nm, more preferably between 300 and 650 nm or between 450 and 600 nm, and most preferably between 460 and 550 nm or between 465 and 500 nm.

The fluorescent molecule may be brilliant sulfaflavine. However, in a preferred embodiment, the fluorescent molecule is food safe. Preferably, the tracer composition is food safe. Advantageously, the tracer composition may be used on crops.

In a preferred embodiment, the fluorescent molecule is a compound of formula (I):

(I)

[Chemical structure of compound (I) with substituents $R^1$, $R^2$, $R^3$, $R^4$, $R^5$, $OR^6$, $OR^7$, $OR^8$ and a phosphate group $HO-P(=O)(OH)-O-$]

wherein each of $R^1$ to $R^8$ is independently hydrogen or a $C_{1-5}$ alkyl, or a salt and/or solvate thereof.

More preferably, the fluorescent molecule is a compound of formula (Ia):

(Ia)

[Chemical structure of compound (Ia) with substituents $R^1$, $R^2$, $R^3$, $R^4$, $R^5$, $OR^6$, $OR^7$, $OR^8$ and a phosphate group, with defined stereochemistry]

wherein each of $R^1$ to $R^8$ is as defined above, or a salt and/or solvate thereof.

It may be appreciated that a $C_{1-5}$ alkyl may be a methyl, ethyl, propyl, butyl or pentyl.

In a preferred embodiment, $R^1$ to $R^8$ may each independently be hydrogen, methyl or ethyl.

Preferably, $R^1$ is hydrogen.

Preferably, $R^2$ is methyl or ethyl, and most preferably methyl.

Preferably, $R^3$ is methyl or ethyl, and most preferably methyl.

Preferably, $R^4$ is hydrogen.

Preferably, $R^5$ is hydrogen.

Preferably, $R^6$ is hydrogen.

Preferably, $R^7$ is hydrogen.

Preferably, $R^8$ is hydrogen.

Accordingly, the fluorescent molecule may be riboflavin 5'-monophosphate or a salt and/or solvate thereof. The salt may be a lithium salt, a sodium salt, a potassium salt, a rubidium salt, a beryllium salt, a magnesium salt, a calcium salt or a strontium salt. In some embodiments, the fluorescent molecule is riboflavin 5'-monophosphate sodium salt or a solvate thereof. In some embodiments, the fluorescent molecule is riboflavin 5'-monophosphate sodium salt dihydrate.

The tracer composition may comprise the florescent molecule at a concentration of at least 0.0001 wt %, more preferably at least 0.001 wt %, at least 0.005 wt % or at least 0.01 wt %, and most preferably at least 0.02 wt %, at least 0.04 wt %, at least 0.06 wt % or at least 0.08 wt %. The tracer composition may comprise the florescent molecule at a concentration of less than 50 wt %, more preferably less than 20 wt %, less than 10 wt %, less than 5 wt %, less than 2 wt % or less than 1 wt %, and most preferably less than 0.8 wt %, less than 0.6 wt %, less than 0.4 wt % or less than 0.2 wt %. The tracer composition may comprise the florescent molecule at a concentration between 0.0001 and 50 wt %, more preferably between 0.001 and 50 wt %, or between 0.005 and 10 wt % or between 0.01 and 1 wt %, and most preferably between 0.02 and 0.8 wt %, between 0.04 and 0.6 wt %, between 0.06 and 0.4 wt % or between 0.08 and 0.2 wt %.

The tracer composition may comprising the gelling agent at a concentration of at least 5 wt %, more preferably at least 10 wt %, at least 20 wt %, at least 30 wt %, at least 40 wt % or at least 50 wt %, and most preferably at a concentration of at least 60 wt %, at least 65 wt % or at least 67.5 wt %. The tracer composition may comprising the gelling agent at a concentration of less than 99 wt %, preferably less than 95 wt %, less than 90 wt %, less than 85 wt % or less than 80 wt %, and most preferably less than 77.5 wt %, less than 75 wt % or less than 72.5 wt %. The tracer composition may comprising the gelling agent at a concentration of between 10 and 99 wt %, more preferably between 20 and 95 wt %, between 30 and 90 wt %, between 40 and 85 wt % or between 50 and 80 wt %, and most preferably at a concentration between 60 and 77.5 wt %, between 65 and 75 wt % or between 67.5 and 72.5 wt %.

The gelling agent may comprise a saccharide, and is preferably a sugar or a polysaccharide, or a salt and/or solvate thereof. The sugar may comprise a disaccharide, or a salt and/or solvate thereof. The disaccharide may be sucrose, lactulose, lactose, maltose, trehalose, cellobiose, chitobiose, or a salt and/or solvate thereof. Preferably, the disaccharide is sucrose, or a salt and/or solvate thereof. The polysaccharide may be linear or cyclic. Accordingly, the polysaccharide may be a cyclodextrin, agarose or gellan gum. The cyclodextrin may be α-cyclodextrin, β-cyclodextrin or γ-cyclodextrin.

In some embodiments, the gelling agent may comprise agar. It may be appreciated that agar comprises agarose and agaropectin. It may be appreciated that agaropectin comprises D-glucuronic acid and pyruvic acid.

The tracer composition may comprise the saccharide at a concentration of at least 5 wt %, more preferably at least 10 wt %, at least 20 wt % or at least 30 wt %, and most preferably at a concentration of at least 32.5 wt %, at least 35 wt % or at least 37.5 wt %. The tracer composition may comprising the saccharide at a concentration of less than 90 wt %, more preferably less than 80 wt %, less than 70 wt % or less than 60 wt %, and most preferably less than 50 wt %, less than 45 wt % or less than 42.5 wt %. The tracer composition may comprising the saccharide at a concentration of between 5 and 90 wt %, more preferably between 10 and 80 wt %, between 20 and 70 wt % or between 30 and 60 wt %, and most preferably at a concentration between 32.5 and 50 wt %, between 35 and 45 wt % or between 37.5 and 42.5 wt %.

The gelling agent may comprise an alcohol, and preferably a glycol. The glycol may be a polyglycol. Accordingly, the glycol may be polyethylene glycol (PEG). Alternatively, the gelling agent comprises a $C_{1-10}$ alcohol or glycol, or a salt and/or solvate thereof. Preferably, the gelling agent comprises a $C_{1-10}$ glycol, or a salt and/or solvate thereof. The $C_{1-10}$ glycol may comprise between 2 and 10 hydroxyl groups. More preferably, the gelling agent comprises a $C_{1-5}$ glycol. The $C_{1-5}$ glycol may comprise between 2 and 5 hydroxyl groups. Most preferably, the gelling agent comprises a $C_{2-4}$ glycol. The $C_{2-4}$ glycol may comprise between 2 and 4 hydroxyl groups. In a most preferred embodiment, the gelling agent comprises glycerol, or a salt and/or solvate thereof.

The tracer composition may comprise the alcohol at a concentration of at least 5 wt %, more preferably at least 10 wt %, at least 15 wt % or at least 20 wt %, and most preferably at a concentration of at least 22.5 wt %, at least 25 wt %, at least 27.5 wt % or at least 30 wt %. The tracer composition may comprising the alcohol at a concentration of less than 90 wt %, more preferably less than 70 wt %, less than 60 wt % or less than 50 wt %, and most preferably less than 40 wt %, less than 37.5 wt %, less than 35 wt % or less than 32.5 wt %. The tracer composition may comprising the alcohol at a concentration of between 5 and 90 wt %, more preferably between 10 and 70 wt %, between 15 and 60 wt % or between 20 and 50 wt %, and most preferably at a concentration between 22.5 and 40 wt %, between 25 and 37.5 wt %, between 27.5 and 35 wt % or between 30 and 32.5 wt %.

Preferably, the gelling agent comprises a sugar and a $C_{1-10}$ glycol. Advantageously, the inventors have found that the sugar and the polyol in combination synergistically improve fluorescence of the fluorescent molecule.

The weight ratio of the saccharide to the alcohol may be between 1:10 and 10:1, more preferably between 5:1 and 1:5, between 1:4 and 4:1, between 1:3 and 3:1 or between 1:2 and 2:1, most preferably between 1.75:1 and 1:1, between 1.5:1 and 1.1:1 or between 1.3:1 and 1.2:1.

Preferably, the composition comprises a stabilising agent which improves the photostability of the fluorescent molecule. The stabilising agent may improve the photostability of the fluorescent molecule by absorbing photons. It may be appreciated that the wavelength of the photons absorbed by the stabilising agent may vary depending upon the fluorescent molecule. In one embodiment, the stabilising agent may absorb photons with a wavelength between 100 and 500 nm, more preferably between 150 and 400 nm or between 175 and 350 nm, and most preferably between 200 and 325 nm. It may be appreciated that light with a wavelength of between 100 and 280 nm, otherwise known as ultraviolet C, is absorbed by the ozone layer and atmosphere. Accordingly, photons with these wavelengths are not present in natural light at ground level. For this reason, the upper part of the above recited ranges may be of more importance. In some embodiments, the stabilising agent may absorb photons with a wavelength between 280 and 500 nm, more preferably between 280 and 470 nm or between 280 and 400 nm, and most preferably between 280 and 350 nm. Advantageously, the stabilising agent protects the fluorescent molecule from these wavelengths of light.

Alternatively, or additionally, the stabilising agent may be a free radical scavenger. Advantageously, the stabilising agent protects the fluorescent molecule from free radicals.

The stabilising agent may comprise thiosulfuric acid, ascorbic acid, β-carotene, ethylenediaminetetraacetic acid (EDTA), thiourea, methionine, thiosulfuric acid, butylated hydroxytoluene (BHT), or a salt and/or solvate thereof. The methionine may be present in a racemic mixture. Alternatively, the methionine may comprise D-methionine or L-methionine. The salt may be a lithium salt, a sodium salt, a potassium salt, a rubidium salt, a beryllium salt, a magnesium salt, a calcium salt or a strontium salt.

Preferably, the stabilising agent comprises a compound of formula (II):

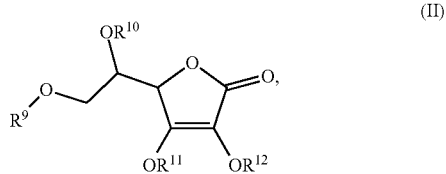

wherein each of $R^9$ to $R^{12}$ is independently hydrogen or a $C_{1-5}$ alkyl, or a salt and/or solvate thereof.

More preferably, the stabilising agent comprises a compound of formula (IIa):

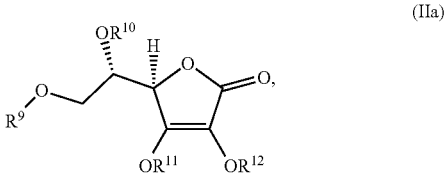

wherein each of $R^9$ to $R^{12}$ is as defined above, or a salt and/or solvate thereof.

Preferably, each of $R^9$ to $R^{12}$ is hydrogen. Accordingly, the stabilising agent may comprise ascorbic acid, and more preferably L-ascorbic acid, or a salt and/or solvate thereof.

The tracer composition may comprise the stabilising agent at a concentration of at least 0.01 wt %, more preferably at least 0.1 wt %, at least 0.5 wt %, at least 1 wt % or at least 1.5 wt %, and most preferably at a concentration of at least 2 wt %, at least 2.5 wt %, at least 3 wt % or at least 3.5 wt %. The tracer composition may comprising the stabilising agent at a concentration of less than 90 wt %, more preferably less than 50 wt %, less than 30 wt % or less than 10 wt %, and most preferably less than 7.5 wt %, less than 5 wt %, less than 4.5 wt % or less than 4 wt %. The tracer composition may comprising the stabilising agent at a concentration of between 0.01 and 90 wt %, more preferably between 0.1 and 50 wt %, between 0.5 and 30 wt % or between 1 and 10 wt %, and most preferably at a concentration between 2 and 7.5 wt %, between 2.5 and 5 wt %, between 3 and 4.5 wt % or between 3.5 and 4 wt %.

The tracer composition may comprise a solvent. The solvent may comprise water or an organic solvent, such as an alcohol. The alcohol may be ethanol. In some embodiments, the solvent may comprise organic solvents, such as an alcohol, to increase the solubility of components within the composition. However, preferably, the solvent is water, and more preferably de-ionised water. Advantageously, water is the same solvent used in the majority of commercially available plant protection products (PPPs). The tracer composition may comprise the solvent at a concentration of at a concentration of at least 1 wt %, more preferably at least 5 wt %, at least 10 wt % or at least 15 wt %, and most preferably at a concentration of at least 20 wt %, at least 22 wt %, at least 23 wt % or at least 24 wt %. The tracer composition may comprising the solvent at a concentration of less than 90 wt %, more preferably less than 70 wt %, less than 50 wt % or less than 40 wt %, and most preferably less than 30 wt %, less than 28 wt %, less than 26 wt % or less than 25 wt %. The tracer composition may comprising the solvent at a concentration of between 1 and 90 wt %, more preferably between 5 and 70 wt %, between 10 and 50 wt % or between 15 and 40 wt %, and most preferably at a concentration between 20 and 30 wt %, between 22 and 28 wt %, between 23 and 26 wt % or between 24 and 25 wt %.

It may be appreciated that the tracer composition may be added to a plant protection product (PPP).

Accordingly, in accordance with a second aspect there is provided a plant protection composition comprising:
the tracer composition of the first aspect; and
a plant protection product (PPP).

The PPP may be as defined in relation to the first aspect. It may be appreciated that the PPP may be a substance configured to control a pest. Accordingly, the PPP may comprise a herbicide, an insecticide, an acaricide, a nematicide, a molluscicide, a bactericide and/or a fungicide. The PPP may be a commercially available pesticide.

The PPP may be a biopesticide agent. For instance, the PPP may comprise a fungus or the spores thereof. The fungus may be a pathogen which controls a pest. Accordingly, the pesticide agent may comprise *Ampelomyces quisqualis*, *Beauveria bassiana* and/or *Bacillus thuringiensis*.

Alternatively, or additionally, the PPP agent may comprise a small molecule which controls a pest. The PPP may comprise myclobutanil, abamectin, spinosad, pyrimethanil, carbonic acid, thiacloprid, chlorpyrifos, azoxystrobin, chlorantraniliprole, methoxyfenozide, iprodione, captan, fenhexamid, clofentezine, boscalid, pyraclostrobin, pendimethalin, cyprodinil, fludioxonil, tebufenpyrad or a salt and/or solvate thereof. The salt may be a lithium salt, a sodium salt, a potassium salt, a rubidium salt, a beryllium salt, a magnesium salt, a calcium salt or a strontium salt. In particular, the salt of carbonic acid may be sodium bicarbonate or potassium bicarbonate and is preferably potassium bicarbonate. It may be appreciated that the term "captan" can refer to the compound identified by IUPAC name (3aR,7aS)-2-[(Trichloromethyl)sulfanyl]-3a,4,7,7a-tetrahydro-1H-isoindole-1,3(2H)-dione.

The plant protection composition may comprise the tracer composition in an amount which is at least 0.01% (v/v), more preferably at last 0.1% (v/v), at least 0.25% (v/v), at least 0.5% (v/v) or at least 0.75% (v/v), and most preferably at least 1% (v/v). The plant protection composition may comprise the tracer composition in an amount which is less than 50% (v/v), more preferably less than 40% (v/v), less than 30% (v/v), less than 20% (v/v) or less than 10% (v/v), and most preferably is less than 5% (v/v). The plant protection composition may comprise the tracer composition in an amount which is between 0.01 and 50% (v/v), more preferably between 0.1 and 40% (v/v), between 0.25 and 30% (v/v), between 0.5 and 20% (v/v) or between 0.75 and 10% (v/v), and most preferably is between 1 and 5% (v/v).

The plant protection composition may comprise the PPP in an amount which is at least 20% (v/v), more preferably at least 40% (v/v), at least 60% (v/v) or at least 80% (v/v), and most preferably at least 90% (v/v) or at least 95% (v/v). The plant protection composition may comprise the PPP in an amount which is less than 99.99% (v/v), more preferably less than 99.9% (v/v) and most preferably is less than 99% (v/v). The plant protection composition may comprise the PPP in an amount which is between 20 and 99.99% (v/v), more preferably between 60 and 99.9% (v/v) or between 40 and 99.9% (v/v), and most preferably between 90 and 99% (v/v) or between 95 and 99% (v/v).

Preferably, the PPP has a pH of less than 10 at 20° C., more preferably less than 9 at 20° C. or 8 at 20° C., and most preferably less than 7 at 20° C. Preferably, the PPP has a pH of more than 4 at 20° C., more preferably more than 6 at 20° C.

Alternatively, the tracer composition may be diluted for analysis without being combined with a PPP.

Accordingly, in a further aspect there is provided an analysis composition comprising:
the tracer composition of the first aspect; and
a solvent.

The solvent may comprise water and/or an alcohol. Preferably, the solvent comprises water.

The analysis composition may comprise the tracer composition in an amount which is at least 0.01% (v/v), more preferably at last 0.1% (v/v), at least 0.25% (v/v), at least 0.5% (v/v) or at least 0.75% (v/v), and most preferably at least 1% (v/v). The analysis composition may comprise the tracer composition in an amount which is less than 50% (v/v), more preferably less than 40% (v/v), less than 30% (v/v), less than 20% (v/v) or less than 10% (v/v), and most preferably is less than 5% (v/v). The analysis composition may comprise the tracer composition in an amount which is between 0.01 and 50% (v/v), more preferably between 0.1 and 40% (v/v), between 0.25 and 30% (v/v), between 0.5 and 20% (v/v) or between 0.75 and 10% (v/v), and most preferably is between 1 and 5% (v/v).

The analysis composition may comprise the solvent in an amount which is at least 20% (v/v), more preferably at least 40% (v/v), at least 60% (v/v) or at least 80% (v/v), and most preferably at least 90% (v/v) or at least 95% (v/v). The analysis composition may comprise the solvent in an amount which is less than 99.99% (v/v), more preferably less than 99.9% (v/v) and most preferably is less than 99% (v/v). The analysis composition may comprise the solvent in an amount which is between 20 and 99.99% (v/v), more preferably between 60 and 99.9% (v/v) or between 40 and 99.9% (v/v), and most preferably between 90 and 99% (v/v) or between 95 and 99% (v/v).

In accordance with a third aspect, there is provided an apparatus comprising:
a light emitting device to selectively illuminate a surface at a first wavelength, wherein the surface has a material thereon;
an imaging device for generating a first fluorescence image in response to the illumination of said surface at the first wavelength; and
a processor configured to process the fluorescence image to determine a coverage information and/or a dosage information of said material.

The light emitting device may be a dual wavelength light emitting device to selectively illuminate the surface at the first wavelength and a second wavelength;
the imaging device generates a first visual image in response to the illumination of said surface at the second wavelength; and
the processor is configured to: process the first visual image to generate a mask indicative of an area of the first visual image; generate a second fluorescence image by masking the first fluorescence image using the mask; and process the second fluorescence image to determine said coverage information and/or said dosage information of said material.

The first wavelength may be in the range of 400 to 500 nm.

The second wavelength may be in the range of 500 to 600 nm.

The light emitting device may comprise at least one light emitting diode. Each of said at least one light emitting diodes may be placed in a back focal plane of said light emitting device to provide a uniform pattern of light to illuminate said surface.

The light emitting device may further comprise at least one of:
a first planoconvex lens;
at least one emission filter; and
a second planoconvex lens.

The surface may comprise a plant or a part thereof.

In accordance with a further aspect, there is provided a method comprising:
selectively illuminating a surface at a first wavelength, wherein the surface has a material thereon;
generating a first fluorescence image of said surface in response to the illumination at the first wavelength;
processing the first fluorescence image to determine a coverage information and/or a dosage information of said material.

The material could be a bacteria. Accordingly, the method of the further aspect could be used to detect bacteria on a surface. For instance, the first wavelength could cause the bacteria to fluoresce.

However, in a preferred embodiment, the material is the tracer composition of the first aspect or the plant protection composition of the second aspect. Accordingly, the method may comprise initially spraying the surface with a spray composition comprising the tracer composition of the first aspect or the plant protection composition of the second aspect. The method may comprise processing the first fluorescence image to determine a coverage information and/or a dosage information of said tracer composition or plant protection composition.

The surface may comprise a plant, or a part thereof. In some embodiments, the plant comprises a crop plant. The term "crop plants" as used herein, includes any edible or non-edible plant, including decorative, plant species with commercial value, which is planted and cultivated for commercial use. Thus, crop plants include floral and non-floral plants, trees, vegetable plants, turf, and ground cover. It will be appreciated that trees include fruit trees. The term "plant" is meant to include germinant seeds, emerging seedlings, and established vegetation, including roots and above-ground portions (for example, leaves, stalks, flowers, fruits, branches, limbs, root, etc.). The term "turf" used herein refers to grass which grow in areas in which they are desired, or purposely planned for and maintained, for example, a lawn. Turf also refers to a sod, where the surface layer of ground consisting of a mat of grass and grass roots.

Non-limiting specific examples of crop plants include members of the genera *Allium, Apium, Asparagus, Brassica, Camellia, Cicera, Citrus, Coffea, Daucus, Fragaria, Glycine, Helinthus, Lactuca, Lens, Linum, Malus, Phaseolus, Pisum, Prunus, Pyrus, Ricinus, Rubus, Sinapis, Solanum, Spinacia, Theobroma, Vanilla, Vicia, Vitis* and *Zea. More specifically, the crop plants may include apple trees, asparagus, beans, broccoli, Brussel sprout, cabbage, cacao tree, carrot plants, castor oil plants, cauliflowers, celery, cherry tree, chickpea plants, coffee plants, grape vines, Jerusalem artichokes, leeks, lentil plants, lettuce, linseed, maize, mustard plants, onions, orange trees, peach trees, pea plants, pear trees, potato plants, rapeseed, raspberry plants, spinach, strawberry plants, sunflowers, tea plants, tomato plants and vanilla plants. Beans may include black beans, broad beans, butter beans, common beans, faba* beans, fava beans, French beans, green beans, kidney beans, lima beans, pinto beans, runner beans and/or soybeans.

Advantageously, the method allows a user to determine spray deposition of PPP on a crop plant.

The method may further comprise:

selectively illuminating the surface at the first wavelength and a second wavelength;

generating a first visual image of said surface in response to the illumination at the second wavelength;

processing the first visual image to generate a mask indicative of an area of the first visual image;

generating a second fluorescence image by masking the first fluorescence image using the mask; and processing the second fluorescence image to determine said coverage information and/or said dosage information of said material.

The first wavelength may be between 150 and 700 nm, between 300 and 650 nm, between 350 and 600 nm or 400 and 500 nm. In some embodiments, the photon does not have a wavelength of 460 nm. This is because photons with a wavelength of 460 nm may be absorbed by chlorophyll. Accordingly, the first wavelength may be between 465 and 500 nm.

The second wavelength is preferably different to the first wavelength. The second wavelength may be between 450 and 650 nm, between 475 and 625 nm or between 500 and 600 nm.

The first fluorescent image may record the emission of light with a predetermined wavelength in the area. The predetermined wavelength is preferably different to the first wavelength. The predetermined wavelength may be between 450 and 650 nm, more preferably between 475 and 625 nm, and most preferably between 500 and 600 nm.

The method may further comprise:

generating a plurality of candidate first visual images at different illumination intensities; and selecting one of said plurality candidate first visual images as said first visual image.

The method may further comprise:

generating a plurality of candidate first fluorescence images at different illumination intensities; and selecting one of said plurality candidate first fluorescence images as said first fluorescence image.

Said selecting may select the best candidate according to a metric. Said metric may include determining the candidate with the most pixels having a pixel value above a first threshold value and/or the candidate with the most pixels below a second threshold value.

Determining coverage information may comprise determining a percentage of the surface covered by the material. Determining a percentage of the surface covered by the material may comprise determining a quantity of fluorescent pixels as a percentage of all pixels of the respective fluorescence image, wherein a fluorescent pixel is a pixel having a pixel value above a fluorescence threshold.

Alternatively, or additionally, determining said dosage information may comprise:

determining an amount of fluorescence based on an intensity of each fluorescent pixel of the respective fluorescence image, wherein a fluorescent pixel is a pixel having a threshold above a fluorescence threshold; and determining dosage information based on the amount of fluorescence.

Alternatively, or additionally, processing the respective fluorescence image comprises:

converting pixels of the fluorescence image into a binary image based on whether or not each pixel is above or below a fluorescence threshold; and determining boundaries of droplets of said material based on the binary image.

Accordingly, the method may comprise analysing determining the number of deposits of the material on the surface. The method may comprise determining the size of the deposits of the material on the surface. The method may comprise determining the average size of the deposits. Alternatively, the average size of the droplets may be known based upon the method used to spray the surface with the spray composition. The method may comprise determining said dosage information based upon the amount of the deposits and/or the average size thereof.

Selectively illuminating the surface may comprise illuminating the surface as a uniform pattern of light.

All features described herein (including any accompanying claims, abstract and drawings), and/or all of the steps of any method or process so disclosed, may be combined with any of the above aspects in any combination, except combinations where at least some of such features and/or steps are mutually exclusive.

For a better understanding of the invention, and to show how embodiments of the same may be carried into effect, reference will now be made, by way of example, to the accompanying drawings, in which:—

FIG. 1 shows the excitation and emission spectra matrices (EEMs) in solution of A) brilliant sulfaflavin pH 7; B) tryptophan; C) vanillin; and D) riboflavin 5'-monophosphate sodium salt (FMN-Na);

FIG. 2 shows the background fluorescence for a number of crops;

FIG. 3 is a graph showing the fluorescence FMN-Na in solution and as a dry deposit;

FIG. 4 is a graph showing how the fluorescence of FMN-Na is effected by exposure to sunlight;

FIG. 5 shows how sucrose and glycerol affect the fluorescence of FMN-Na;

FIG. 6 shows sunlight-induced photodegradation of FMN-Na in the presence of a number of compounds;

FIG. 7 is a graph showing the UV absorbance of FMN-Na, ascorbic acid and sodium thiosulphate;

FIG. 8 is a graph showing the effect that varying concentrations of ascorbic acid and sodium thiosulphate had on the photostability of FMN-Na;

FIG. 16 is a block diagram of a system in accordance with an example embodiment;

EXAMPLE 1—IDENTIFY SUITABLE FLUORESCENT TRACER

Figure 1A:
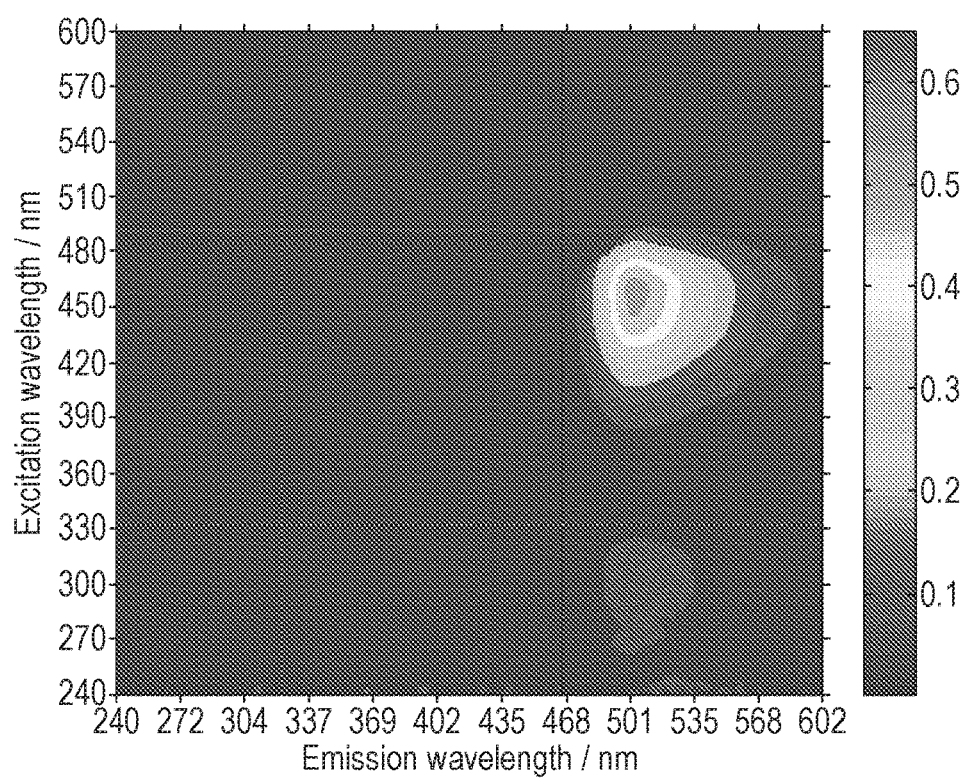
Figure 1B:
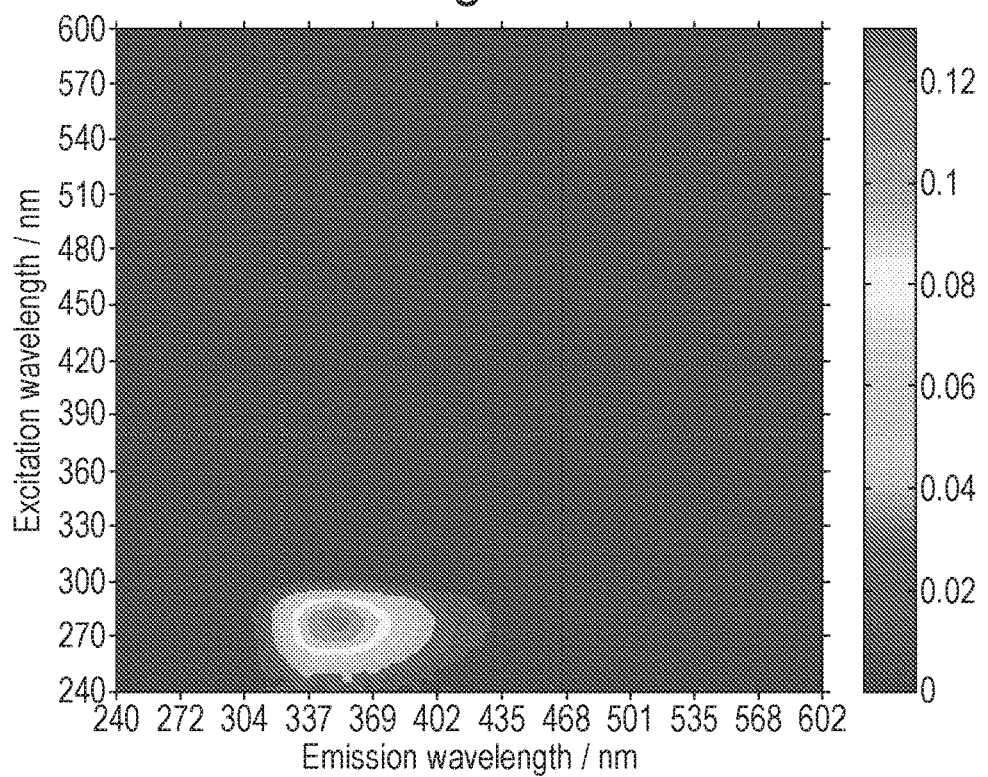
Figure 1C:
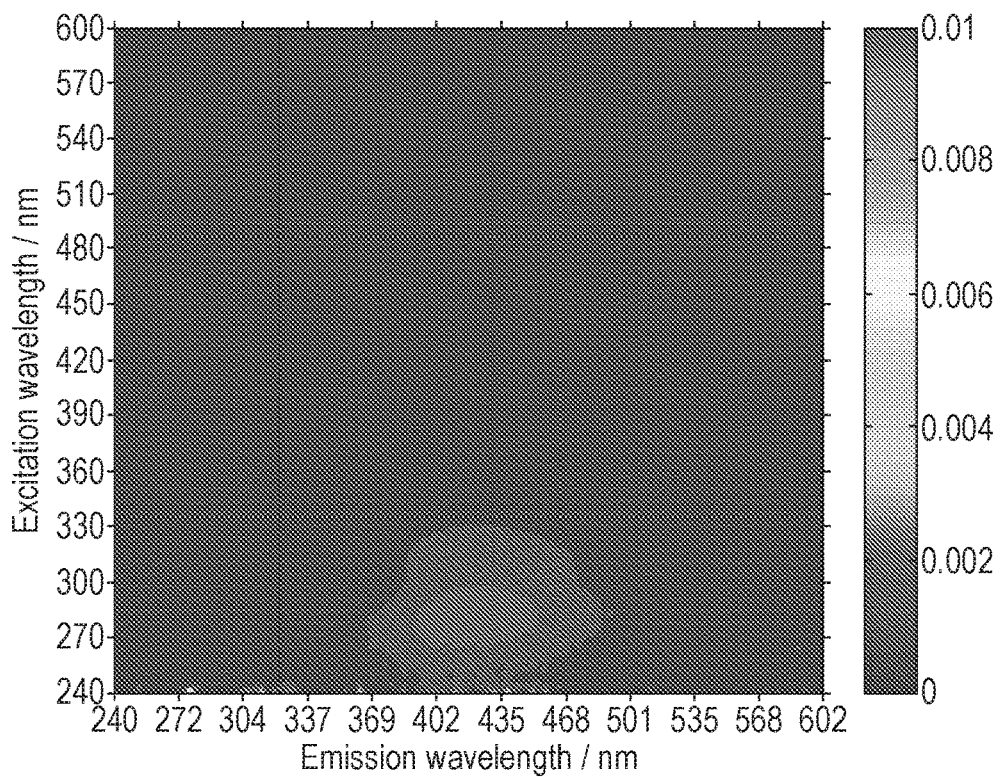
Figure 1D:
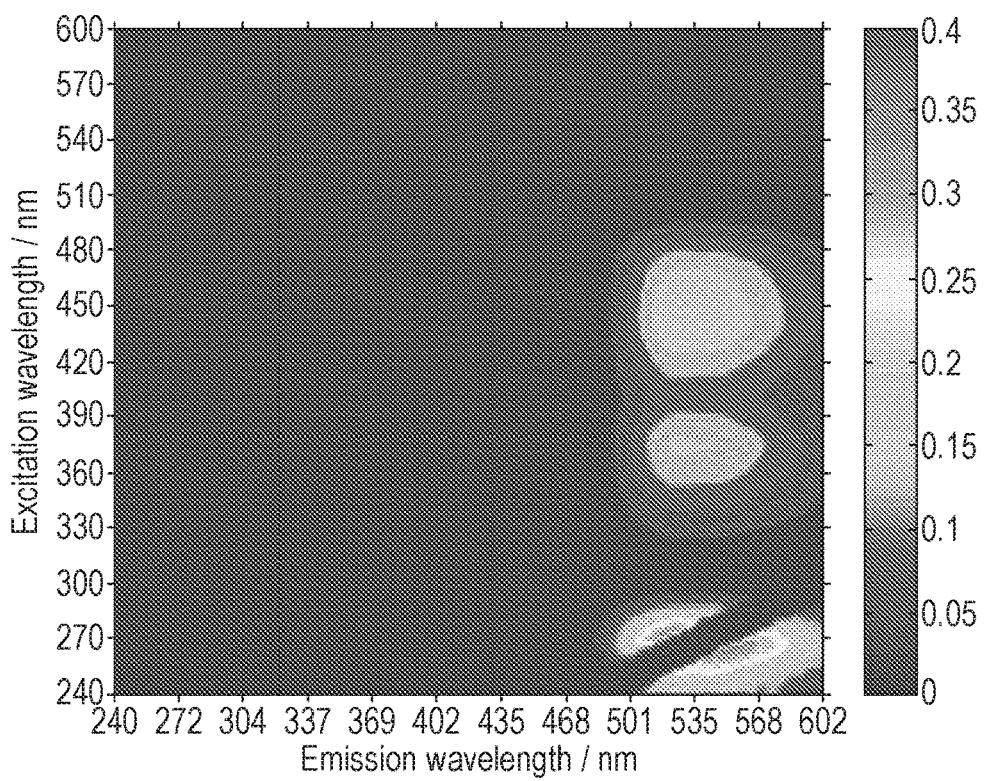

Firstly, the inventors wanted to identify a fluorescent tracer that could be used in a method of detecting and analysing the extent and thoroughness of spray deposition. A suitable tracer would ideally:
a) have a high fluorescence quantum yield;
b) be detectable with minimal interference from background fluorescence of a plant;
c) be water soluble;
d) not require the use of a pH buffer;
e) possess adequate light stability characteristics;
f) be safe and acceptable for use on edible crops; and
g) be cost effective.

Initially, 140 potential compounds were identified. An initial screen, taking the above factors into consideration, left 21 possible compounds. CTG's Horiba Aqualog was used to measure the compounds' excitation and emission spectra matrix (EEM) in solution and in solid phase, the solution results for four of the potential compounds are shown in FIG. 1. Riboflavin 5'-monophosphate sodium salt (FMN-Na), a version of vitamin B2, was selected as the preferred compound. In particular, Riboflavin 5'-monophosphate was selected because it absorbs photons in the visible part of electromagnetic spectrum, which reduces the chances of interference from other compounds in plant tissues that fluoresce under UV light. Furthermore, the emission of fluorescing riboflavin 5'-monophosphate is between 500-580 nm. This is well away from the absorbance and emission spectrum of chlorophyll, thus providing reduced background fluorescence.

For the fluorescent tracer to be effective it must be compatible with widely used pesticides. Accordingly, the inventors prepared an initial solution of FMN-Na in deionised water, where the FMN-Na was present at a concentration of 0.013 mg/ml. The baseline fluorescence of solutions of known pesticides, prepared according to their label instructions, was measured. The initial solution of FMN-Na was then added to the known pesticides, so that the final pesticide preparations had a resulting concentration of FMN-Na of 0.25 μg/ml, and the fluorescence was measured again. The baseline fluorescence was subtracted to determine the amount of fluorescence which was due to the FMN-Na, and this was compared to the fluorescence observed for a concentration of FMN-Na of 0.25 μg/ml in de-ionised water. The results are shown in Table 1.

TABLE 1

Effect of common pesticides on riboflavin fluorescence

| Pesticide Tested | Active Agent(s) | Effect on riboflavin fluorescence in solution (%) |
| --- | --- | --- |
| Switch ® | Cyprodinil and fludioxonil | −115 |
| DiPel ® | *Bacillus thuringiensis* subspecies *kurstaki* | −108 |
| Stomp ® Aqua | Pendimethalin | −98 |
| Signum ® | Boscalid and pyraclostrobin | −70 |
| Apollo ® | Clofentezine | −51 |
| Teldor ® | Fenhexamid | −48 |
| Captan | Captan (IUPAC name (3aR,7aS)-2-[(Trichloromethyl)sulfanyl]-3a,4,7,7a-tetrahydro-1H-isoindole-1,3(2H)-dione) | −42 |
| Rovral ® | Iprodione | −41 |
| Runner ® | Methoxyfenozide | −25 |
| Naturalis ® | *Beauveria bassiana* strain ATCC 74040 | −24 |
| AQ10 ® | *Ampelomyces quisqualis* strain M10 | −22 |
| Coragen ® | Chlorantraniliprole (Rynaxpyr ®)) | −20 |
| Masia ® | Tebufenpyrad | −17 |
| Amistar ® | Azoxystrobin | −15 |
| Cyren ® | Chlorpyrifos | −15 |
| Calypso ® | Thiacloprid | −11 |
| Potassium bicarbonate | Potassium bicarbonate | −7 |
| Scala ® | Pyrimethanil | −7 |
| Tracer ® | Spinosad | −6 |
| Agrimec ® | Abamectin | −5 |
| Sysythane ® 20EW Fungicide | Myclobutanil | −1 |

Some of the pesticide products appear to exhibit some slight fluorescence, which may have affected the results to a certain degree. In particular, it will be noted that for both Switch® and DiPel® a decrease in fluorescence of greater than 100% is observed. This may be due to these pesticides reducing or quenching the fluorescence of riboflavin and, at the same time, the fluorescence of the pesticide may also have been quenched due to the addition of FMN-Na, thus causing an overall greater than 100% loss of fluorescence.

Despite these results, it is noted that the vast majority of the pesticides tested reduced the fluorescence of FMN-Na by less than 50%. This suggests that FMN-Na could be used with a large number of pesticides.

The inventors also investigated the background fluorescence exhibited by a number of plants using a handheld imaging fluorometer, and the results are shown in FIG. 2. The inventors noted that background fluorescence is not a problem for a wide range of crops and tissue types.

Accordingly, FMN-Na was identified as a suitable fluorescence tracer.

EXAMPLE 2—IMPROVING THE FLUORESCENT PROPERTIES OF FMN-Na

Figure 3:
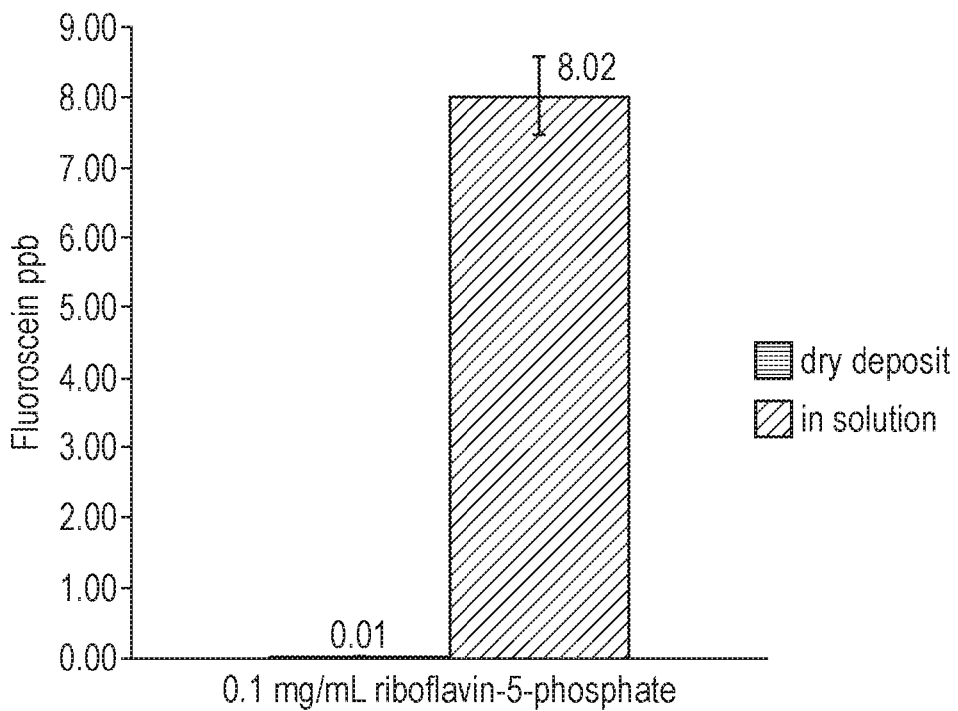
Figure 4:
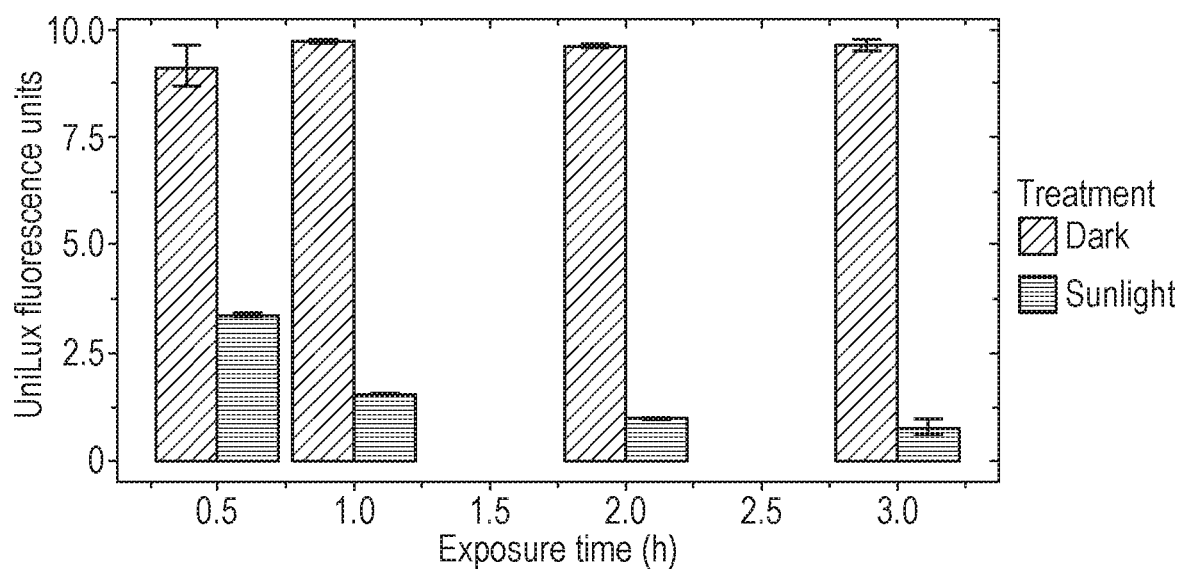

As shown in FIGS. 3 and 4, FMN-Na displayed a low quantum yield when dry and very poor photostability properties.

Figure 5:
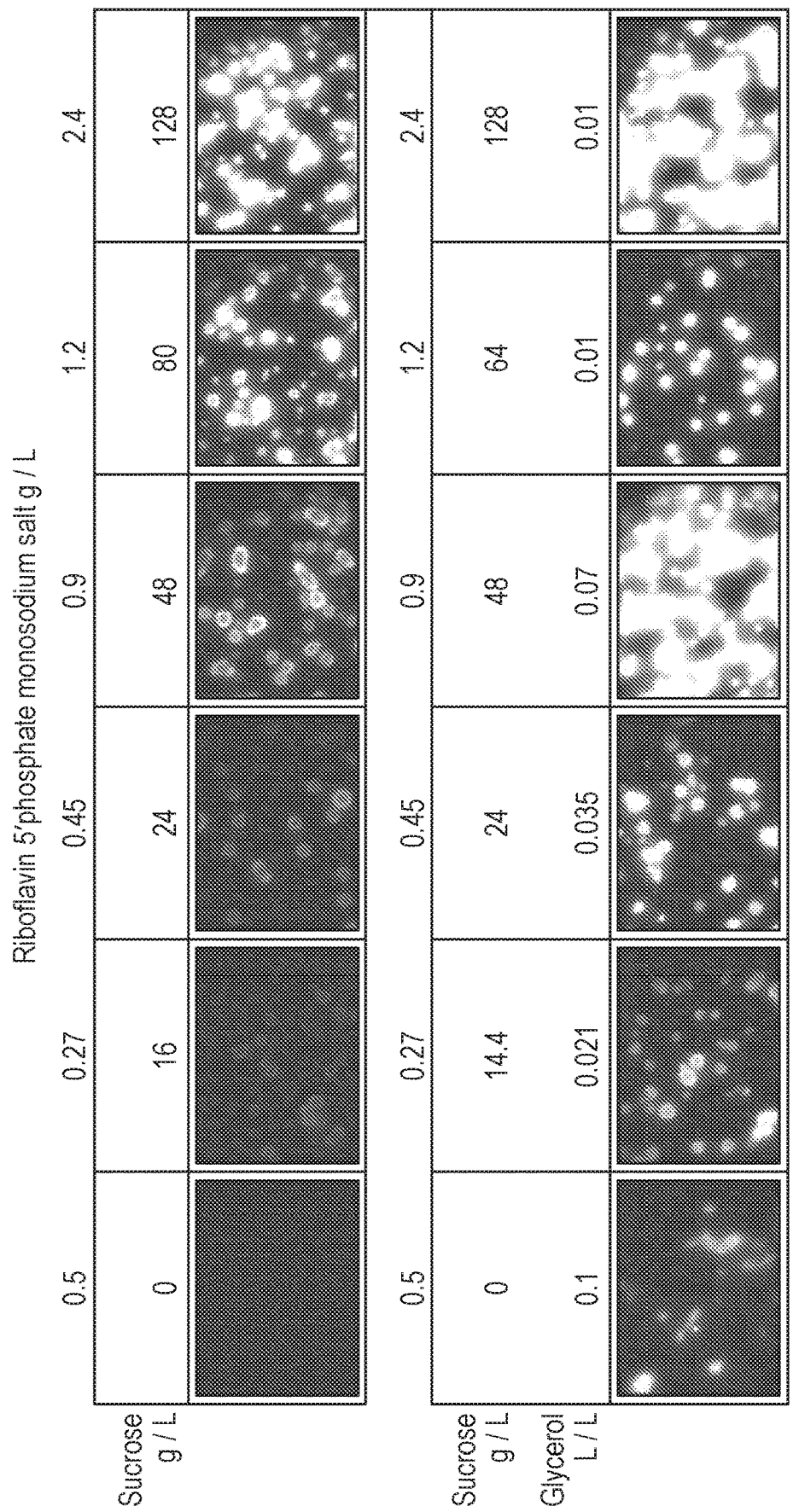

As shown in FIG. 5, the inventors found that it was possible to improve the fluorescent properties of FMN-Na by combining it with gelling agents. In particular, sucrose and glycerol were used as these compounds are safe and edible. It is noted that both compounds improved the fluorescent properties of FMN-Na when used alone, but offered a particular improvement when used in combination.

EXAMPLE 3—IMPROVING THE STABILITY OF FMN-Na

Figure 6:
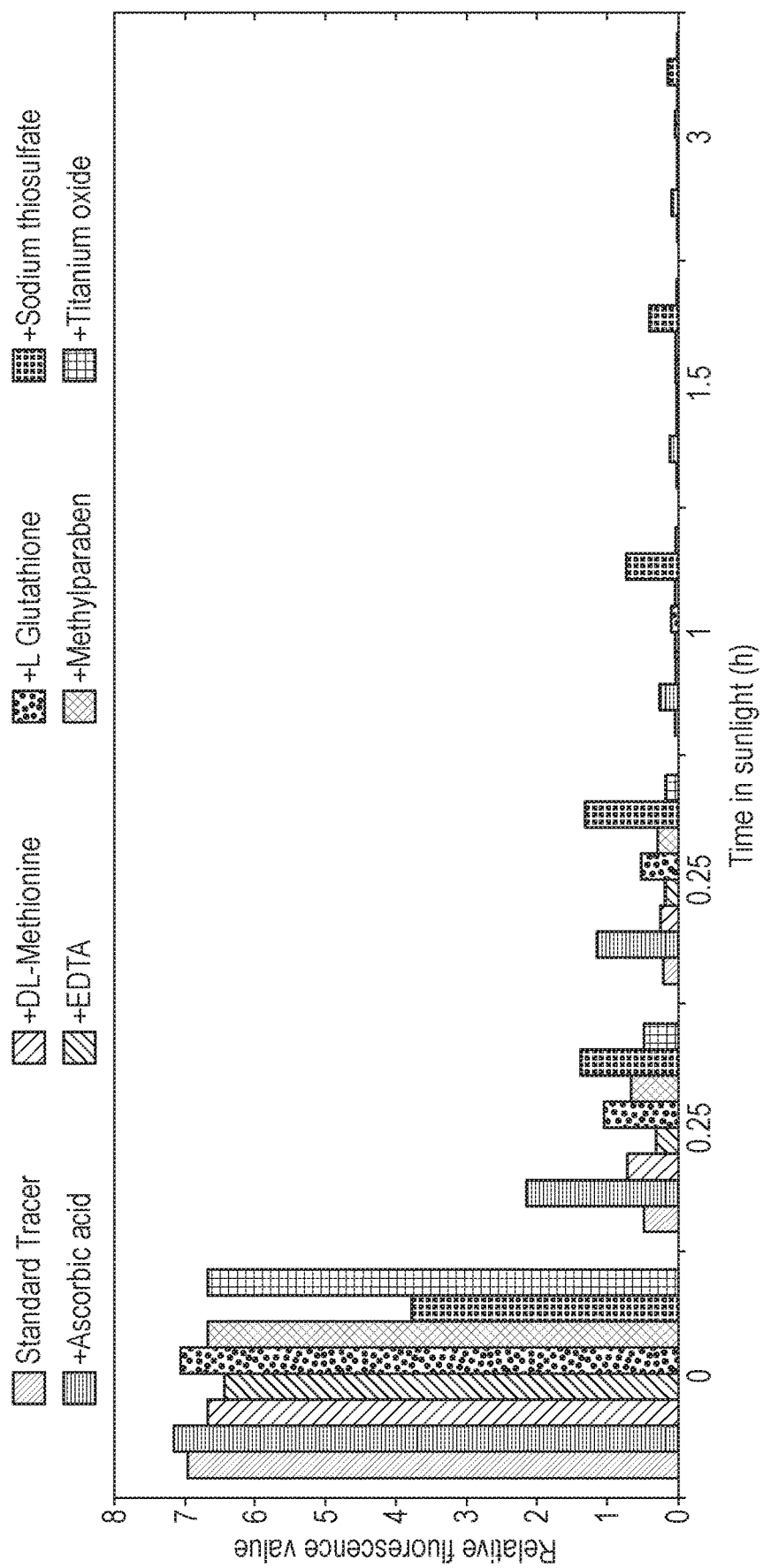

The inventors found that FMN-Na was unstable in sunlight, and neither sucrose nor glycerol improved its stability. Accordingly, the inventors tested the effect a number of compounds had on the photodegradation of FMN-Na, and the results are shown in FIG. 6. The two most effective compounds tested were ascorbic acid and sodium thiosulphate.

Figure 7:
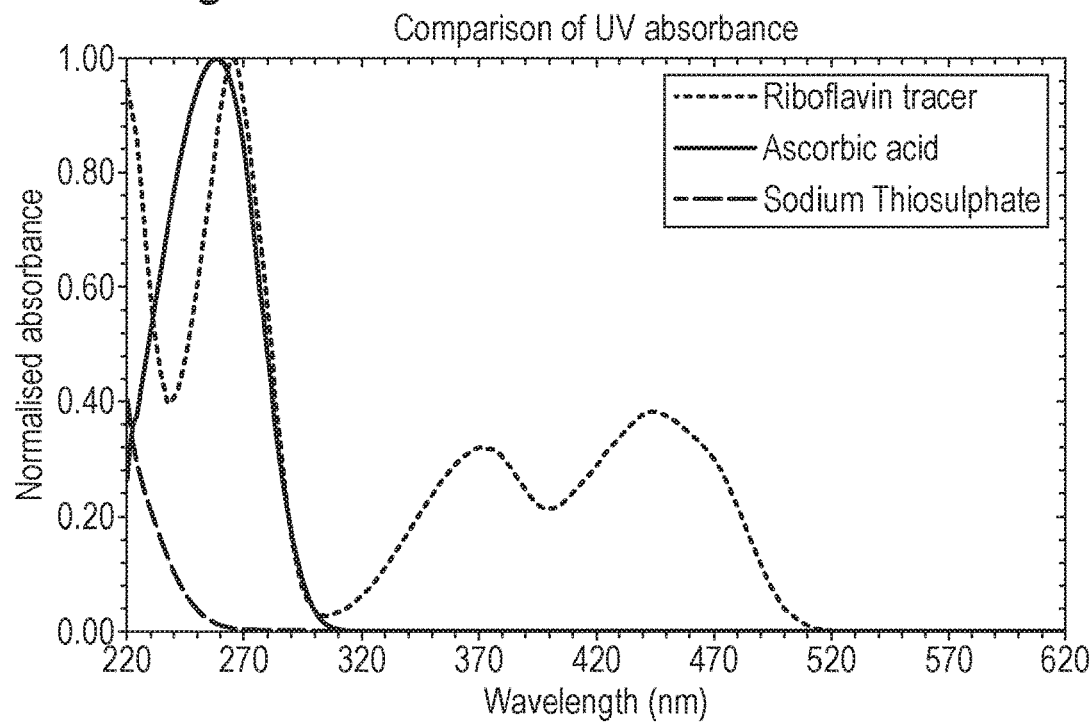

FIG. 7 shows the UV absorbance spectra for FMN-Na, ascorbic acid and sodium thiosulphate. It will be noted that ascorbic acid closely matches the absorbance spectra of riboflavin between 220 and 300 nm. Without wishing to be bound by theory, it is thought that by absorbing light between these wavelengths the ascorbic acid prevents photodegradation of FMN-Na. It is noted that ascorbic acid is also a free radical scavenger. Accordingly, this action could also be responsible for the improvement in the stability of FMN-Na.

To investigate this, the inventors prepared a tracer composition comprising the following components:

20 g riboflavin-5'-phosphate sodium salt (food grade);
800 g sucrose (food grade)
0.5 L glycerol (food grade); and
0.5 L water (deionised).

In some compositions, ascorbic acid and/or sodium thiosulphate were also added to give a concentration of 0.85M or 1.7M, prior to the addition of glycerol.

A further formulation (formulation D) was prepared by dissolving tocopheryl acetate in a 1:1 weight ratio in ethanol. The ethanol solution was then added to a formulation comprising ascorbic acid. The amount of water in this formulation was reduced so that the total volume of the formulation was the same and the concentration of the other components was not affected. Tocopherol compounds were tested as they have been reported to interact with ascorbic acid and possibly riboflavin to reduce the process of photodegradation.

All of the compositions were then diluted 2% (v/v) with deionised water to give final testing solutions. The concentrations of the various components in the final formulations tested are provided in table 2.

TABLE 2

Components present in tested formulations

| | Concentration (g/l) | | | | | | |
|---|---|---|---|---|---|---|---|
| | Standard | A | B | C | D | E | F |
| Riboflavin-5'-phosphate sodium salt | 14.26 | 14.26 | 14.26 | 14.26 | 14.26 | 14.26 | 14.26 |
| Sucrose | 570.26 | 570.26 | 570.26 | 570.26 | 570.26 | 570.26 | 570.26 |
| Glycerol | 449.08 | 449.08 | 449.08 | 449.08 | 449.08 | 449.08 | 449.08 |
| Deionised water | 356.41 | 356.41 | 356.41 | 356.41 | 335 | 356.41 | 356.41 |
| Ascorbic acid | — | 106.7 | 53.5 | 53.5 | 106.7 | — | — |
| Sodium thiosulphate | — | — | — | 47.9 | — | 95.8 | 47.9 |
| Tocopheryl acetate | — | — | — | — | 10.75 | — | — |
| Ethanol | — | — | — | — | 10.75 | — | — |

Figure 8:
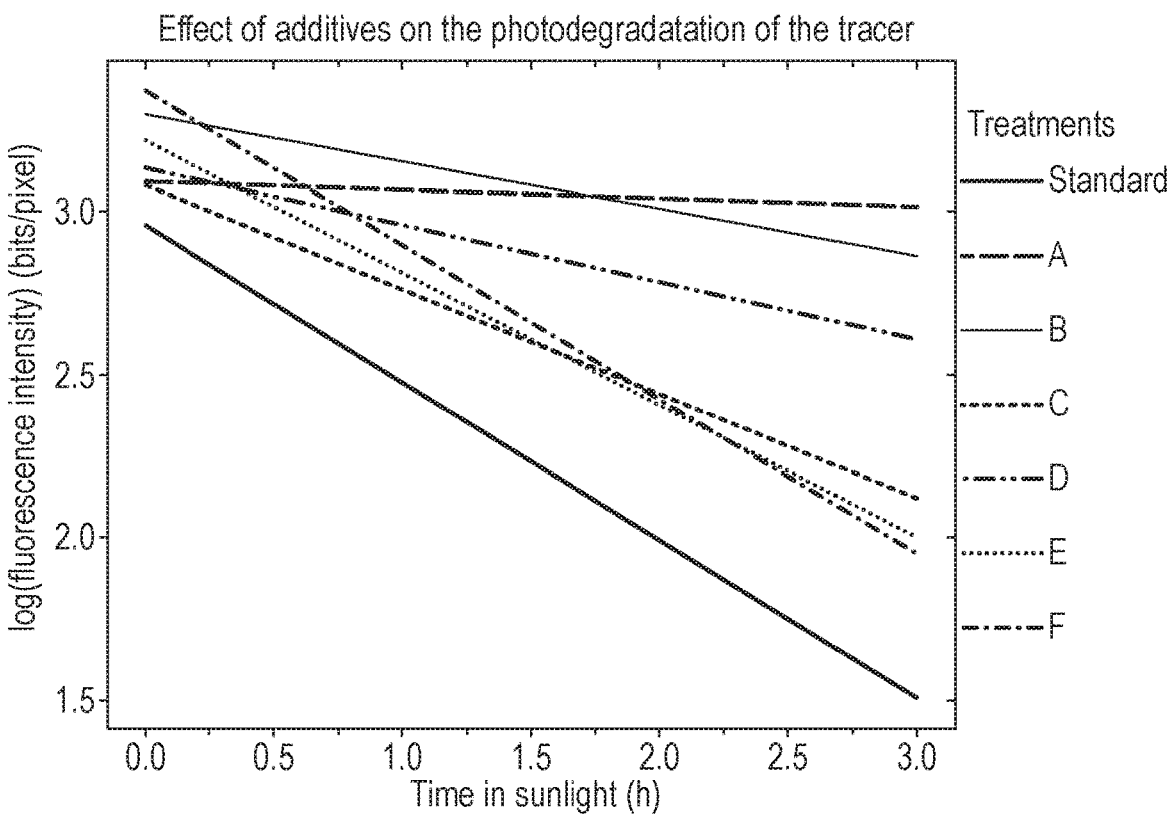

FIG. 8 shows how the photostability of FMN-Na varied in the different formulations. In particular, it will be noted that the stability of FMN-Na was significantly improved when using ascorbic acid at a concentration of 0.85 M, and at a concentration of 1.7M the FMN-Na was substantially photostable. Interestingly, tocopheryl acetate did not appear to have a beneficial effect on the photodegradation of FMN-Na.

Based upon these results, the inventors developed a formulation which they could use in further tests.

In view of the results given in the above examples, the inventors developed a formulation for further testing, and the components of the formulation are given in table 3.

TABLE 3

Tracer composition developed for further testing

| Component | Amount/wt % |
|---|---|
| Riboflavin-5'-phosphate sodium salt | 0.99 |
| Sucrose | 39.5 |
| Glycerol | 31.1 |
| Water (deionised) | 24.7 |
| L-ascorbic acid | 3.7 |

In conclusion, the inventors were able to identify a food safe tracer comprising FMN-Na. The inventors noted that inclusion of sucrose and glycerol was able to greatly enhance the fluorescence of dry deposits and the inclusion of ascorbic acid was able to mitigate photodegradation. The tracer is compatible with a wide range of pesticides and crops. Furthermore, it can be used on crops without crop destruction, and is safe to humans and the environment.

EXAMPLE 4—SPRAY DEPOSIT FLUORIMETER

Figure 9:
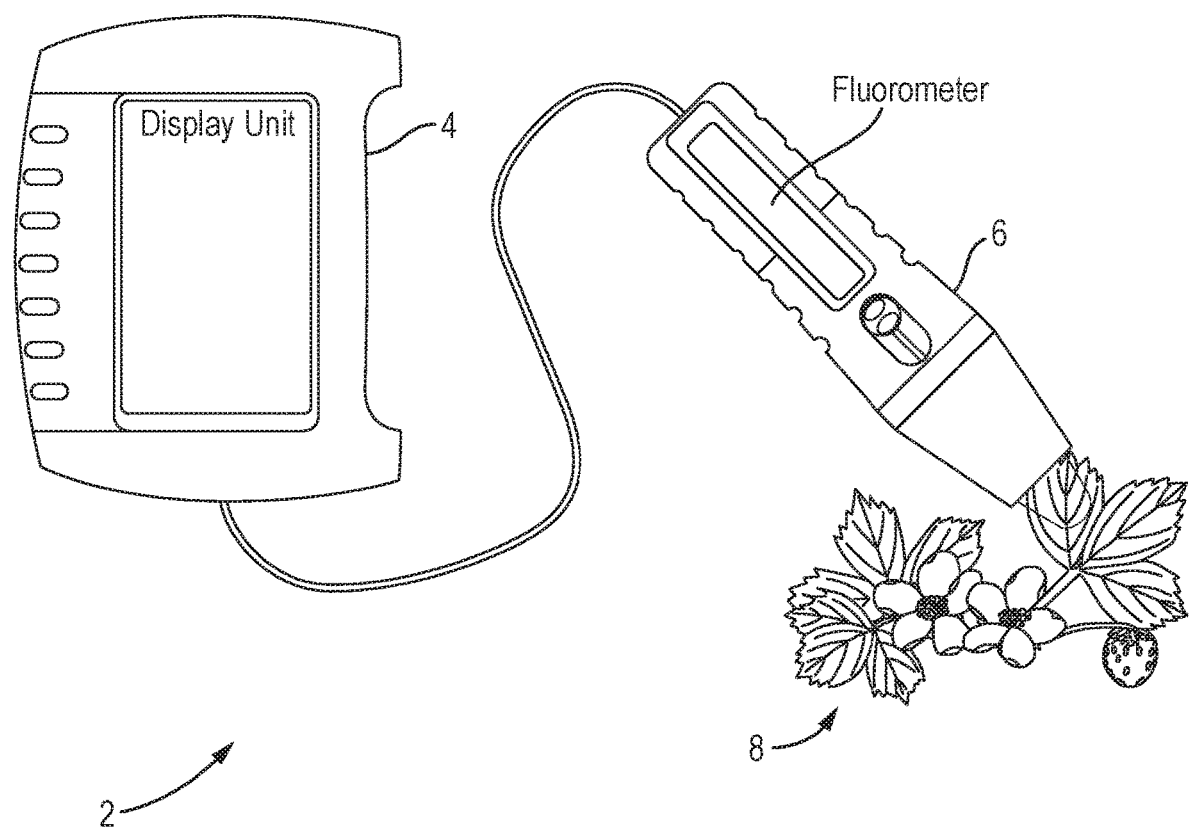
FIG. 9 shows a spray deposit fluorimeter.
Figure 10:
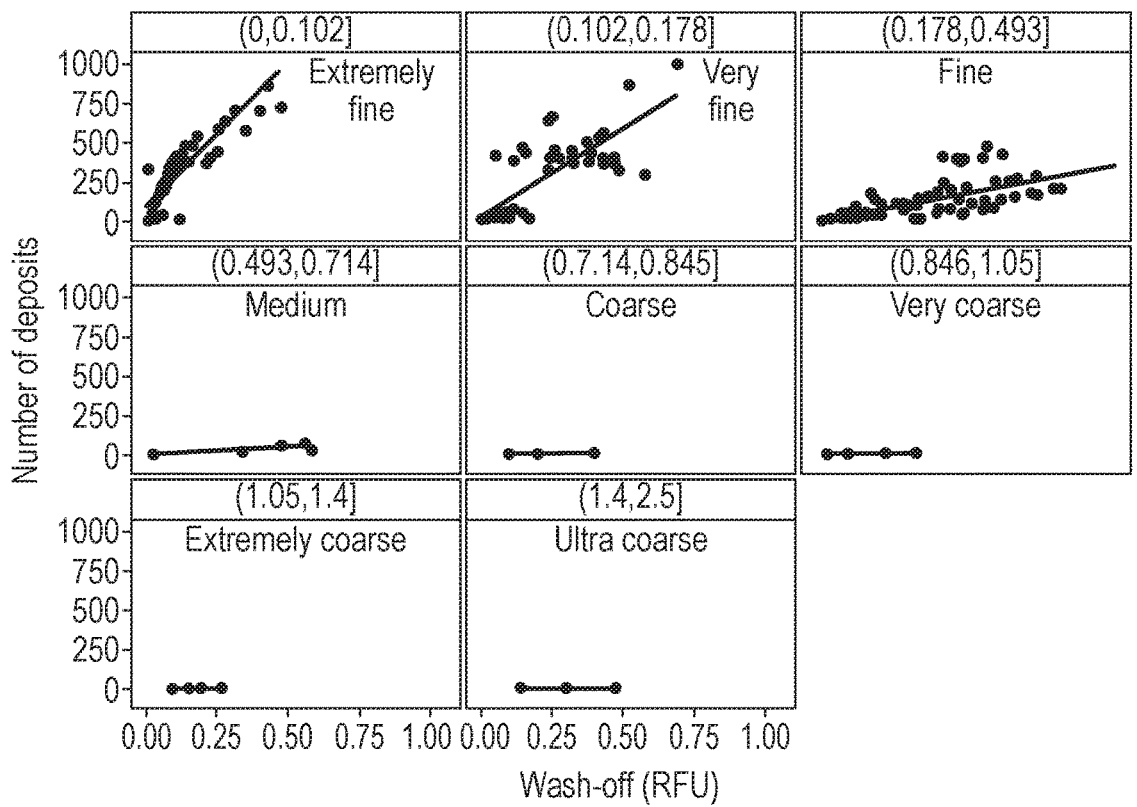
FIG. 10 shows graphs showing the correlation between the number of deposits on a sample and the measured relative fluorescence unit (RFU) of the wash off obtained from the samples, the data is grouped into separate graphs depending upon the size of the deposits.
Figure 11:
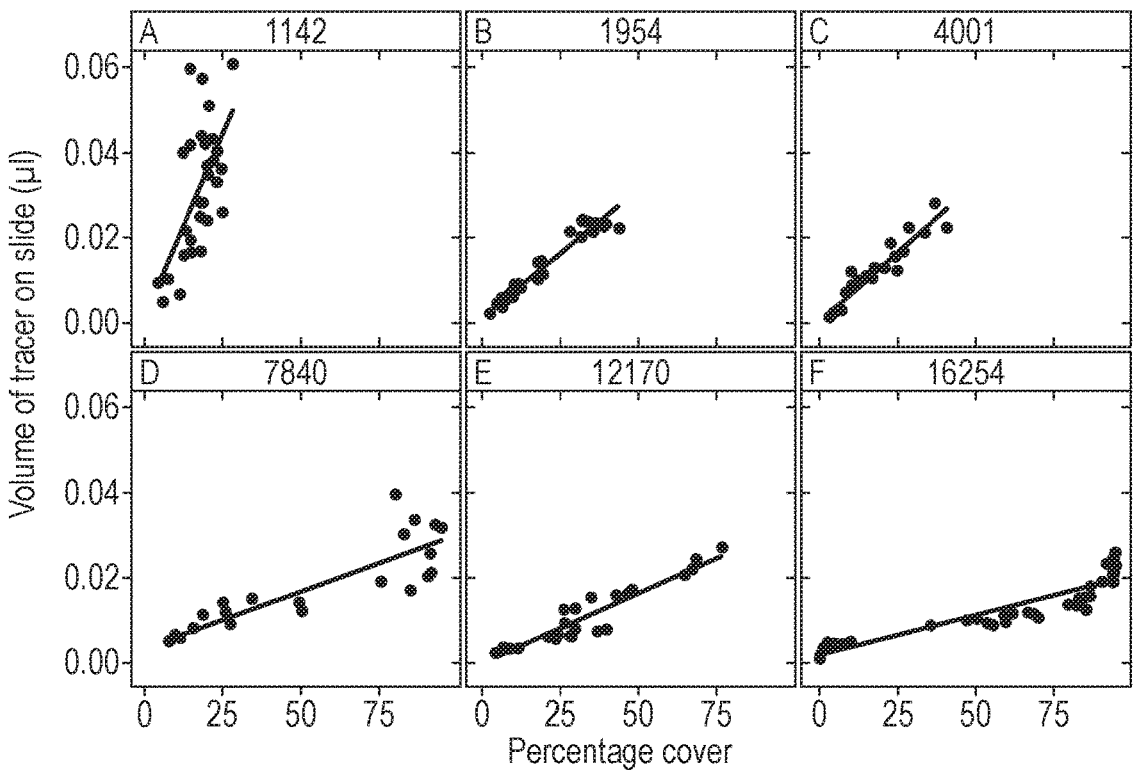
FIG. 11 shows graphs showing the correlation between the volume of tracer on the slide and the percentage cover, the deposits were created using a spinning disk, and the samples are grouped depending upon the revolutions per minute (RPM) of the disk.

The inventors have further developed a spray deposit fluorimeter to allow analysis of the deposited spray to be conducted. A suitable fluorimeter 2 is shown in FIG. 9. The fluorimeter 2 comprises a processing and visualisation module 4 coupled to a detection module 6. The detection module 6 is configured to emit electromagnetic radiation at a predetermined wavelength, for the tracer described in example 1 this wavelength could be between 320 and 490 nm. As shown in the figure, the detection module can be focused on a plant 8 which has been pre-treated with a spray comprising a fluorescent tracer. The detection module 6 is also configured to detect emitted wavelengths of light. For the experiments described below, the emission wavelength used by the inventors was 470 nm and the detected wavelength was 550 nm, but it will be appreciated that other wavelengths could also be used.

FIG. 16 is a block diagram of a system, indicated generally by the reference numeral 170, in accordance with an example embodiment. System 170 shows a surface 171 (such as a plant or leaf surface), a material 172 (such as a tracer material), a light emitting device 173, an imaging device 174, and a processor 175. Viewing FIG. 17 in conjunction with FIG. 9, the surface 171 may be a surface of the plant 8 which is sprayed with a tracer material, such as the material 172. The light emitting device 173 may be comprised within the detection module 6, and the imaging device 174 and processor 175 may be comprised within the processing and visualization module 4.

In an example embodiment, the light emitting device 173 is a dual wavelength light-emitting device. As shown by the dotted arrow 176, the light emitting device 173 illuminates the surface 171 at a first wavelength and a second wavelength. As shown by dotted arrow 177, in response to the illumination, light is received from the surface 171, and the imaging device 174 generates images based on the received light. The generated images are processed at the processor 175, and the processor outputs data 178. In another embodiment, the light emitting device 173 is a single wavelength light-emitting device.

Thus, in general terms, the system 170 provides imaging hardware and processing algorithms. The imaging hardware provides light sources and captures images (e.g. visual and fluorescence images). The processing algorithms extract information from the captured images.

In an example embodiment, the light-emitting device 173 illuminates the surface 171 at a first wavelength and a second wavelength. In one example, the first wavelength is in the range of 400 to 500 nm (e.g. 470 nm) and the second wavelength is in the range of 500 to 600 nm (e.g. 530 nm). In another example, the first wavelength is in the range of 465 nm to 500 nm. The light emitting device 173 may comprise at least one light emitting diode. Each of said at least one light emitting diodes may be placed in a back focal plane of light emitting device 173 to provide a uniform pattern of light to illuminate surface 171. This is explained in further detail below with respect to in FIG. 22.

Figure 17:
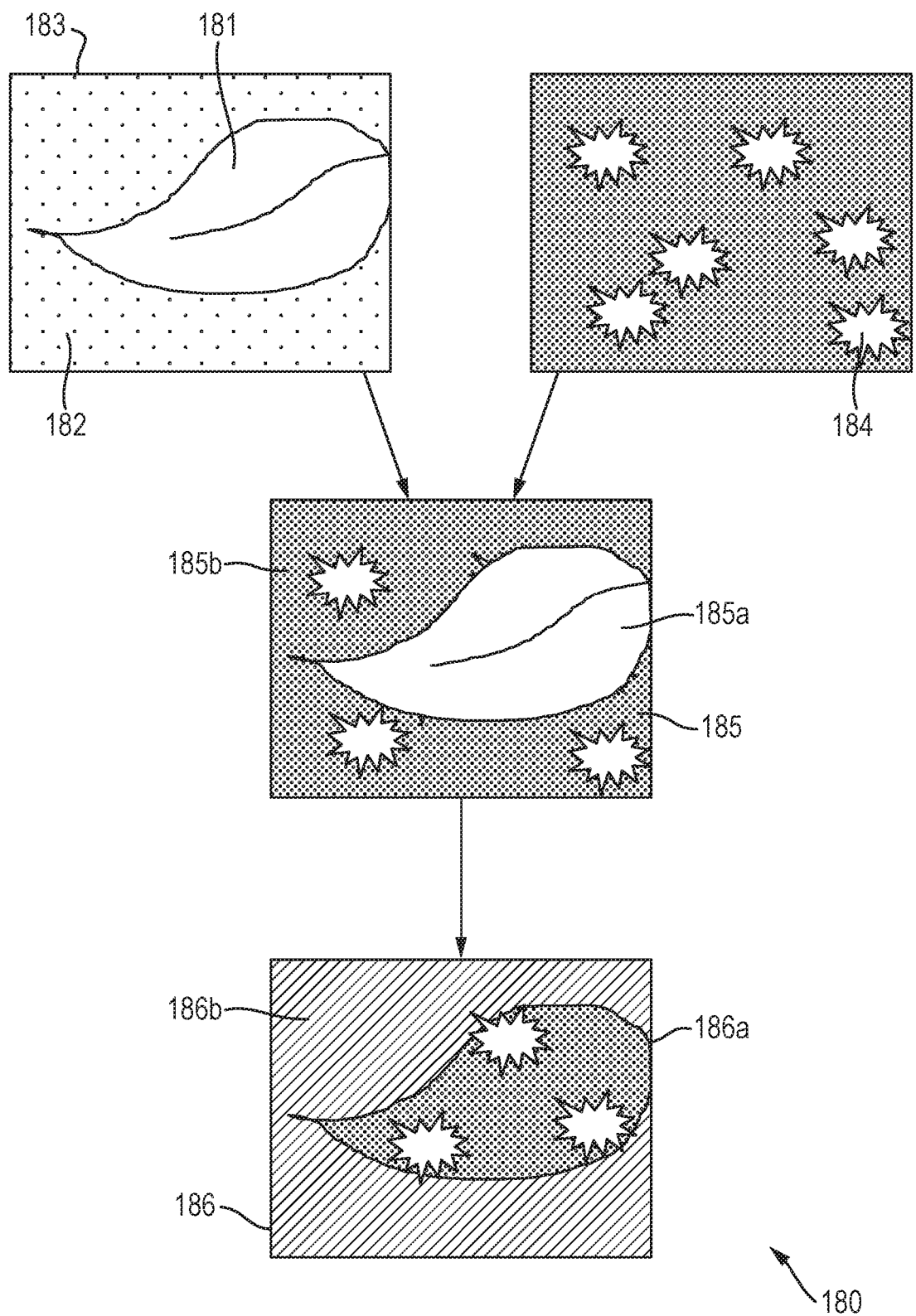
FIG. 17 shows representations of images in accordance with an example embodiment.

FIG. 17 shows representations of images, indicated generally by the reference numeral 180, in accordance with an example embodiment. The images 180 include a first visual image 183, a first fluorescence image 184, a masked image 185, and a second fluorescence image 186. The first visual image 183 is captured by the imaging device 174 in response to the light-emitting device 173 illuminating the surface (a leaf in this example) with visual wavelength light. The first fluorescence image 184 is captured by the imaging device 174 in response to the light-emitting device illuminating the surface with light having a wavelength such that the material 172 is caused to fluoresce.

In the example images 180, the first visual image 183 comprises a leaf area 181 and a background area 182. The first fluorescence image 184 comprises a fluorescence pattern. Of course, if a different surface were being illuminated, then the area 181 would have a different form.

In order to determine the coverage and/or quantity of material applied to a surface (e.g. of a leaf), it is only necessary to process data from the leaf. Thus, the first visual image 183 is used to determined which parts of the fluorescence image should be processed. The masked image 185 comprises a masked area 185a (indicating where fluorescence data is to be processed) and an unmasked area 185b (indicating where fluorescence data is not to be processed).

The second fluorescence image 186 comprises a processed area 186a and an unprocessed area 186b. Thus, fluorescence data within the processed area 186a can be used to determined coverage and/or dosage information, as discussed further below.

As discussed further below, in the event that the leaf area is large enough to cover the entirety of the image 183, then it may not be necessary to generate the masked area 185a, since the first and second fluorescence images would be identical.

Figure 18:
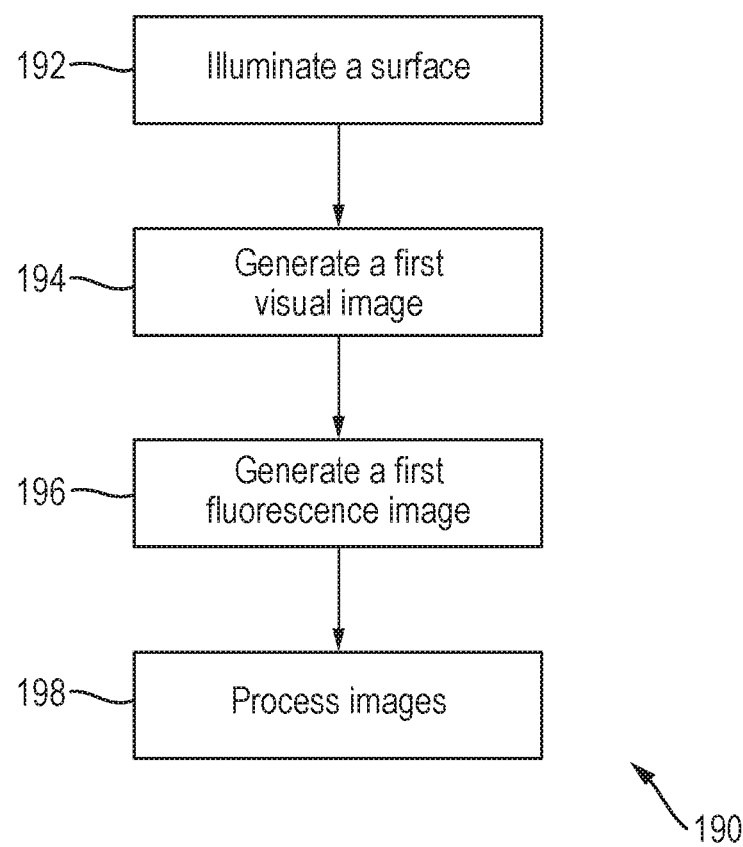
FIGS. 18 to 20 are flow charts showing algorithms in accordance with an example embodiment.

FIG. 18 is a flowchart of an algorithm, indicated generally by the reference numeral 190, in accordance with an example embodiment.

At step 192 of the algorithm 190, a surface (such as surface 171), is illuminated, for example, by light emitting device 173. At step 194, the imaging device, such as imaging device 174, generates a first visual image (in response to the illumination of the surface 171 at the second wavelength) and, at step 196, the imaging device generates a first fluorescence image (in response to the illumination of the surface 171 at the first wavelength). Finally, at step 198, a processor, such as processor 175, processes the generated images. Thus, the steps 194 and 196 can be used to generate the images 182 and 184 described above. Of course, the steps 194 and 196 may be performed in any order and may also be performed simultaneously.

Figure 19:
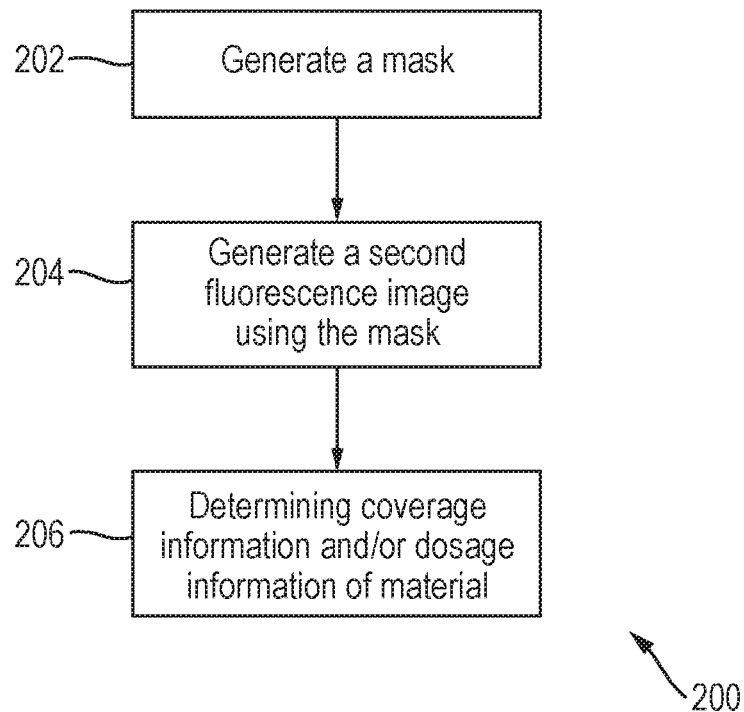

FIG. 19 is a flowchart of an algorithm indicated generally by the reference numeral 200, in accordance with an example embodiment. Algorithm 200 is an example implementation of step 198 of the algorithm 190.

The algorithm 200 starts at step 202, where a mask is generated (based on the first visual image generated in the step 194). At step 204, a second fluorescence image is generated by masking the first fluorescence image (generated in step 196) using the mask. Thus, as shown in FIG. 17, the step 202 may generate the masked image 185 and the step 204 may generated the second fluorescence image 186.

Finally, at step 206, the second fluorescence image 186 is processed to determine the coverage information and/or dosage information of the material 172. The unmasked area of the image is omitted from the second fluorescence image such that any fluorescence detected in the background of the surface being illuminated (as shown in the un-masked area) is not included in calculation of the coverage and/or dosage of the tracer.

In one example embodiment, in order to determine the coverage information and/or dosage information of the material in the step 206, the second fluorescence image is processed by the processor 175. The processor 175 may convert pixels of the second fluorescence image into a binary image based on whether or not each pixel is above or below a fluorescence threshold. For example, if a value of a pixel is below the fluorescence threshold, the pixel is assigned with a binary value of zero and the pixel is determined to be a non-fluorescent pixel; and if a value of a pixel is above the fluorescence threshold, the pixel is assigned with a binary value of one and the pixel is determined to be a fluorescent pixel. The binary image can then be used for determining boundaries of droplets of the material based on the binary values of the pixels.

In one example embodiment, the coverage information of the material 172 is determined in the step 206 based on a percentage of the surface 171 covered by the material 172. For example, the percentage of the surface covered by the material may be determined based on quantity of fluorescent pixels as a percentage of all pixels of the second fluorescence image. As discussed earlier, the fluorescent pixels may be determined based on whether the pixel has a pixel value above a fluorescence threshold.

In one example embodiment, the dosage information of the material 172 is determined in the step 206 based on an amount of fluorescence. For example, the amount of fluorescence is determined based on an intensity of each fluorescent pixel of the second fluorescence image. As discussed earlier, the fluorescent pixels may be determined based on whether the pixel has a pixel value above a fluorescence threshold.

Determinations of coverage and/or quantity may be useful in determination the extent to which are material has been applied to a surface.

The skilled person will be aware of alternative implementations of the step 206.

Figure 20:
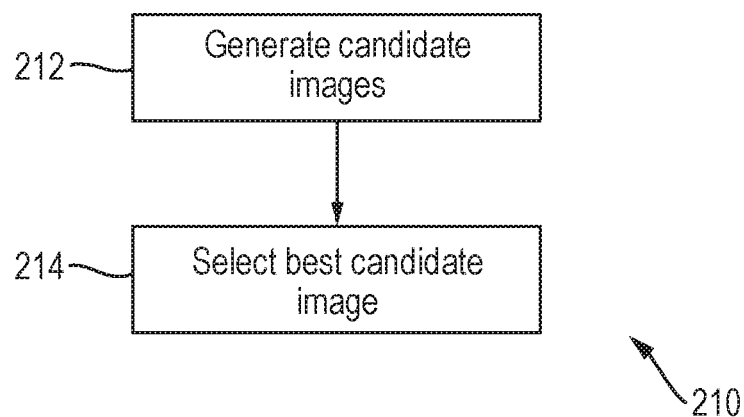

FIG. 20 is a flowchart of an algorithm indicated generally by the reference numeral 210, in accordance with an example embodiment. The algorithm 210 may be used as part of the algorithm 190 described above The algorithm 210 starts at step 212, where the imaging device 174 generates a plurality of candidate images at different illumination intensities. Next, at step 214, the best candidate of the candidates is selected (according to some metric). The algorithm 210 may therefore be used in selecting illumination intensities in the generation of both the first visual image (in step 194) and the first fluorescence image (in step 196). In one example embodiment, three illumination intensities are provided and the most appropriate illumination intensity is chosen for the generation of the said images.

In one example, the metric used in step 214 to select the best candidate may include determining the candidate with the most pixels having a pixel value above a first threshold value (e.g. the most pixels having a value above a zero or noise-threshold). Alternatively, the metric may include determining the best candidate to be the candidate with the most pixels having a pixel value below a second threshold value (e.g. the most pixels below a maximum or saturation threshold).

Figure 21:
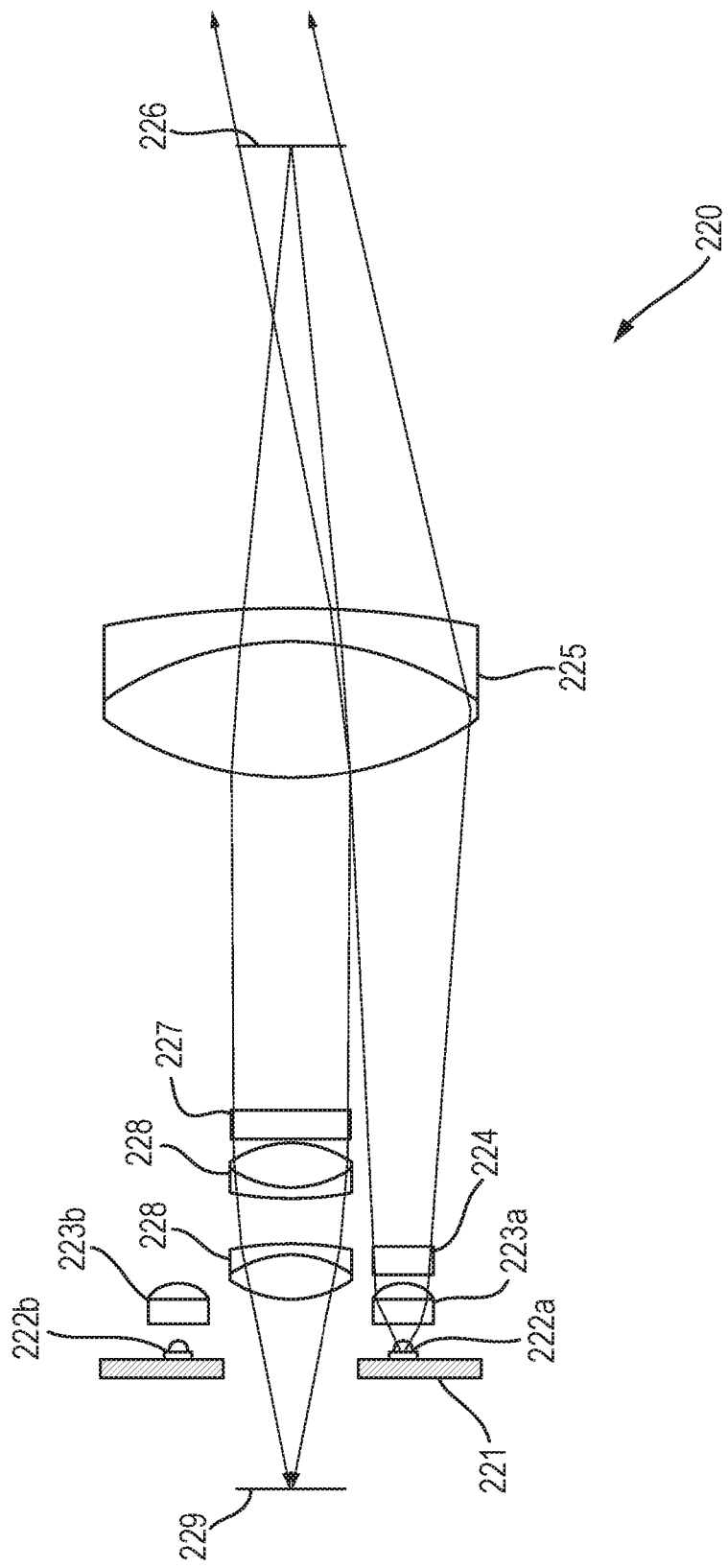
FIG. 21 is a block diagram of a system in accordance with an example embodiment.

FIG. 21 is a block diagram of a system, indicated generally by the reference numeral 220, in accordance with an example embodiment. The system 220 is an example implementation of an arrangement of the light emitting device 173 and the imaging device 174 described above.

The system 220 comprises a first light emitting diode (LED) module 221, a first LED 222a mounted on the first LED module, a second LED 222b (typically mounted on the first LED module, but optionally mounted on a second LED module, not shown), a first lens 223a, a second lens 223b, an excitation filter 224, a third lens 225, a sample surface 226, at least one emission filter 227, a plurality of fourth lenses 228, and a camera sensor or imaging device 229.

In an example embodiment, the first LED 222a is a blue LED emitting blue light (e.g. 470 nm), and the second LED 222b is a green LED emitting green light (e.g. 530 nm).

Thus, the system 220 as shown in FIG. 21 is being used to generate a first fluorescence image and can also be used to generate a first visual image (by illuminating the surface 226 using the second LED 222b). (It should be noted that the LEDs 222a and 222b may be two of a plurality of LEDs within an array; indeed, the LEDs 22a and 222b may be identical, with other LEDs in the array either being identical to those LEDs or different, thereby providing the first and second LEDs of a plurality of LEDs required by some example embodiments.)

In an example embodiment, as shown in system 220, the first and second LEDs 222a and 222b comprised within the LED module 221 are placed in a back focal plane of the dual wavelength light emitting device (system 220) to provide a uniform pattern of light to illuminate the surface of the leaf or plant (i.e. the sample surface 226). Thus, the first and second LEDs 222a and 222b may sit in the back focal plane of the lens 225 (e.g. an achromat lens). By way of example, the illuminated surface may, for example, have an illumination area of the order of 1 cm² on the sample surface 226.

An image (either fluorescent or visual) of the illuminated area is formed on the camera sensor or imaging device 229. To do this, the sample may be positioned in the front focal plane of the lens 225 and the light then passes through the emission filter 227 and the fourth lenses 228 (e.g. a pair of achromat lenses) to focus the image on the camera sensor or imaging device 229. The magnification of the image at the camera sensor or imaging device 229 may be selected to match the illumination area. In this case, a de-magnified image may be produced, if the camera is smaller than the illuminated area.

As indicated above, the lens 225 and/or the fourth lenses 228 may be achromat lenses. However, this is not essential to all embodiments. Other lens configuration (e.g. cheaper or simpler lenses) could be chosen.

Figure 22:
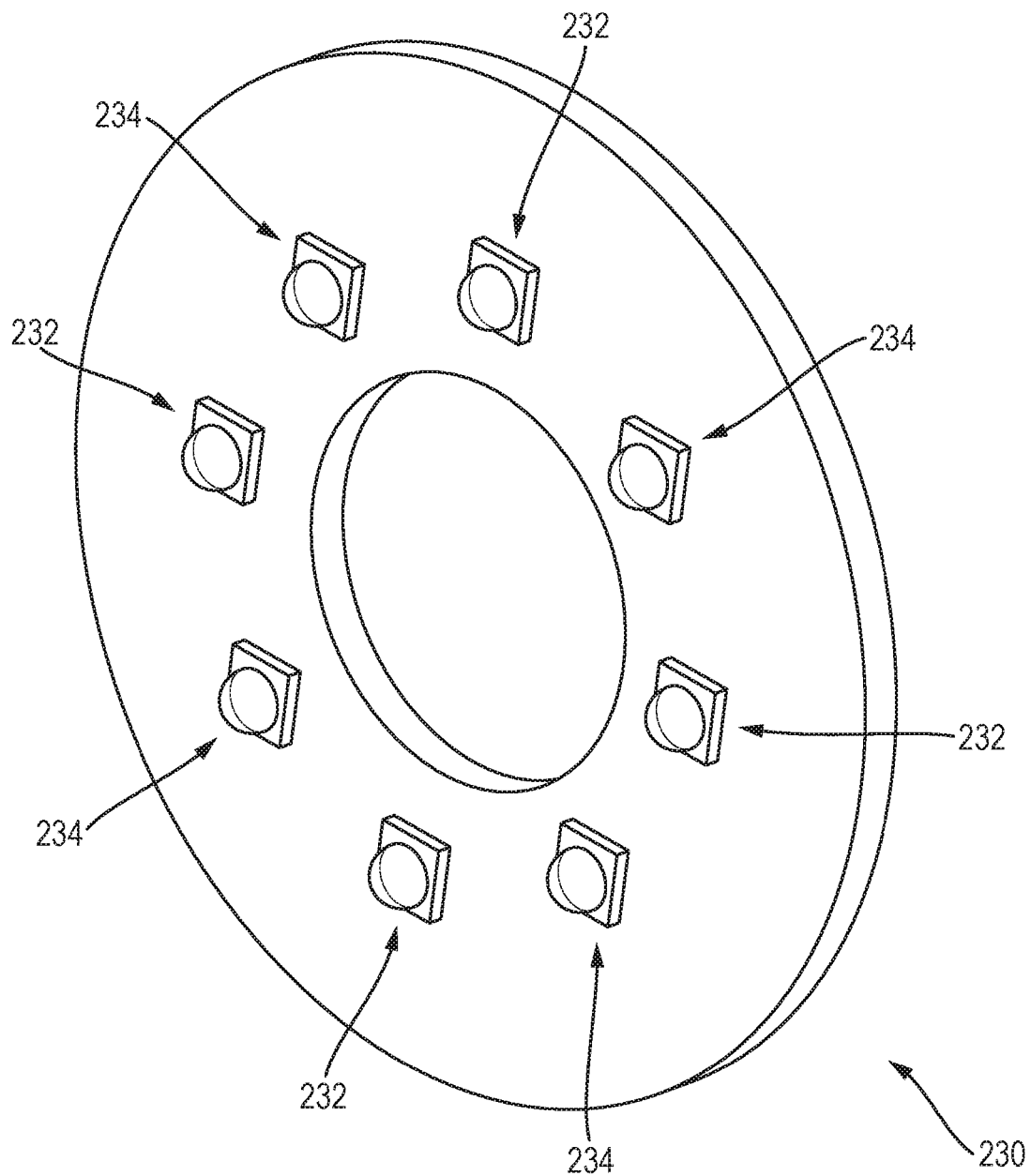
FIG. 22 is a block diagram of a light emitting device in accordance with an example embodiment.

FIG. 22 is block diagram of a system, indicated generally by the reference numeral 230, in accordance with an example embodiment. System 230 shows a LED module (such as LED module 221 described above). The LED module 221 may be a LED printed circuit board (PCB) assembly.

The LED module 221 comprises a plurality of blue LEDs 232 (similar to the first LED 222a) and a plurality of green LEDs 234 (similar to the second LED 222b). The blue LEDs 232 and green LEDs 234 may be arranged in an alternating way as shown in system 230. In the event that the LED module 221 implements the LED module 221 described above, then the relative positions of the first and second LEDs within the module 221 determines whether or not the LEDs 222a and 222b are the identical or different.

Of course, many alternative arrangements of LEDs are possible.

The embodiments described above with reference to FIGS. 16 to 22 generally assume that first and second light emitting devices having different wavelength are used. This is not essential to all embodiments. For example, the generation of a visual image may be omitted in some circumstances.

Figure 23:
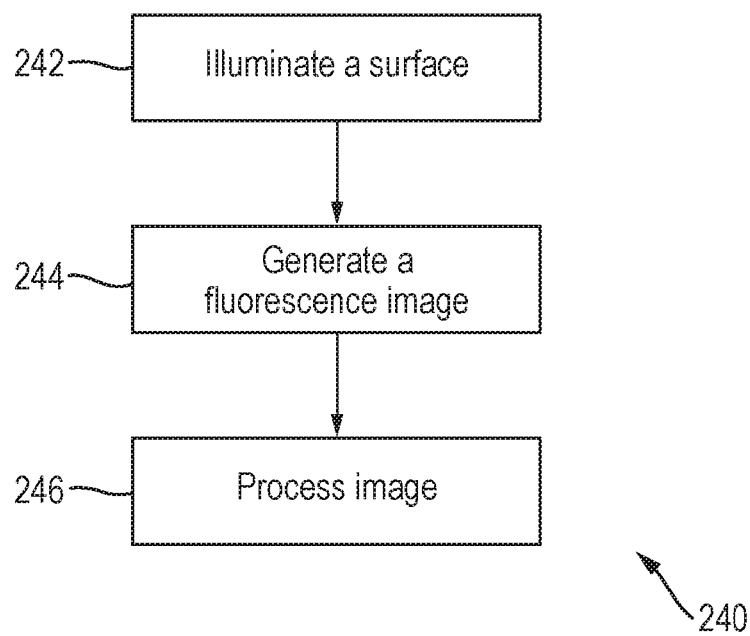
FIG. 23 is a flow chart showing an algorithm in accordance with an example embodiment.

FIG. 23 is a flow chart showing an algorithm, indicated generally by the reference numeral 240, in accordance with an example embodiment.

At step 242 of the algorithm 240, a surface (such as the surface 171 described above), is illuminated, for example, by light emitting device 173. At step 244, the imaging device, such as imaging device 174, generates a fluorescence image (in response to the illumination of the surface 171 at the first wavelength). At step 246, a processor, such as processor 175, processes the fluorescence image.

Figure 24:
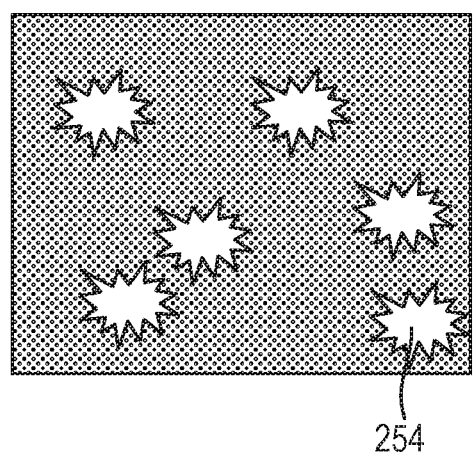
FIG. 24 is a representation of an image in accordance with an example embodiment.

FIG. 24 is a representation of an image, indicated by the reference numeral 254, in accordance with an example embodiment. The image 254 is an example of a fluorescence image that may be generated in the step 244 of the algorithm 240.

In the example image 254, the fluorescence image 184 comprises a fluorescence pattern. The image pattern occupies the entirety of the sampled area, such that there is no need for masking and consequently no need for the generation of a visual image.

Thus, in order to determine the coverage and/or quantity of material applied to a relevant surface, it is only necessary to process the data of the fluorescence image 254.

EXAMPLE 5—CALIBRATION

The inventors tried a variety of methods to calibrate the fluorimeter to allow quantitative analysis, and these are described below. In each of the below described experiments, the tracer formulation provided in table 3 was diluted 2% v/v in deionised water. The diluted formulation was then then sprayed onto laser cut plastic rectangles of fixed sizes (9.5 mm×7 mm) using a modified laboratory sprayer.

Figure 12:
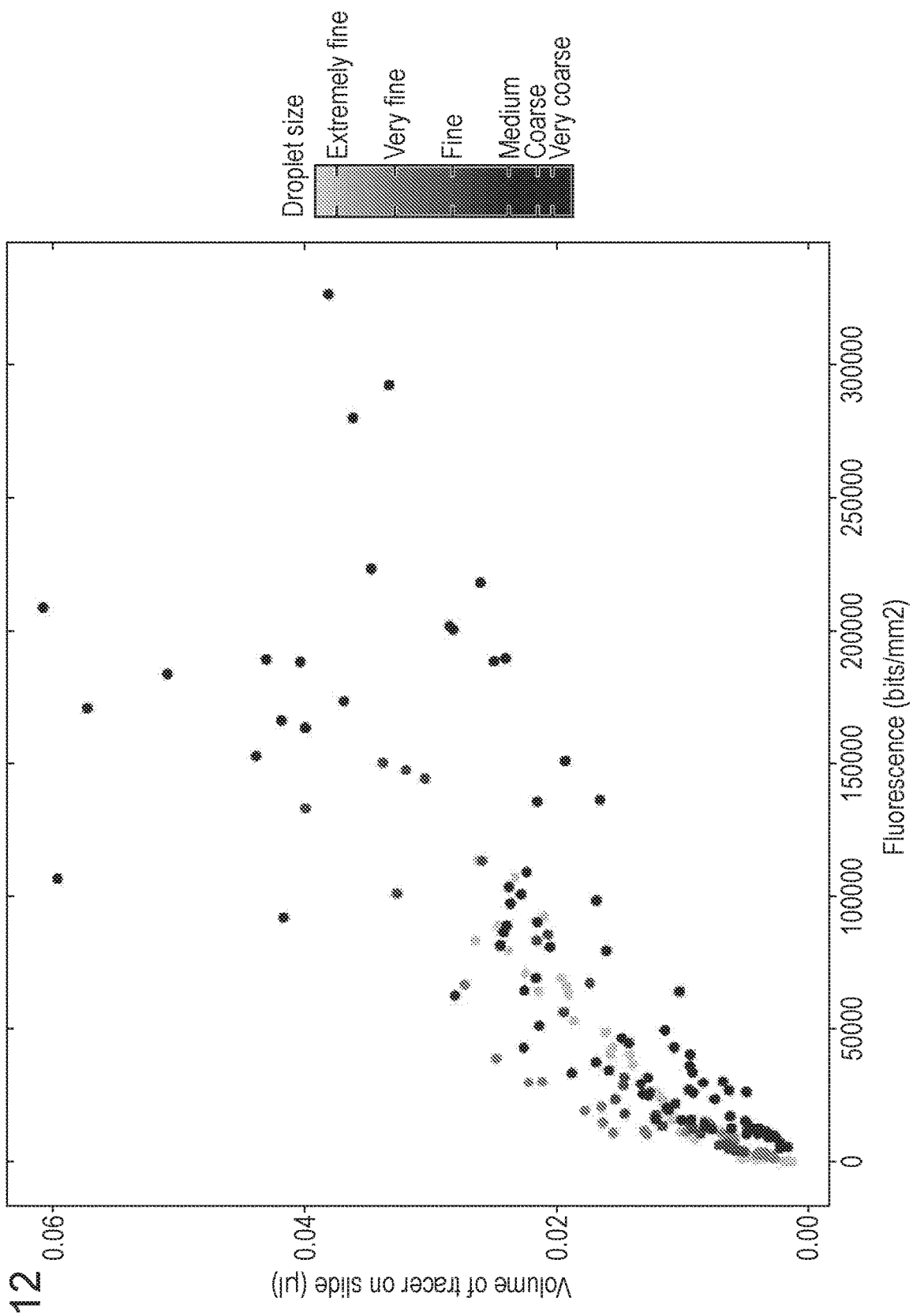
FIG. 12 is a graph showing the correlation between the volume of tracer on the slide and the fluorescence.

The laboratory sprayer was built using a Micron ULVA (Ultra Low Volume Atomiser) spray head. By controlling the flow rate of the liquid onto the ULVA, the rotational speed, and the exposure time of the squares and WSPs, the characteristics of the spray being applied could be varied. The variations applied included the size of the droplets and number of droplets. For each of the experiments described below, the deposits on the plastic rectangles were measured using the prototype handheld imaging fluorometer. In addition the spray deposits on the plastic squares were washed off into 4 ml of deionised water, and the fluorescence measured using a benchtop fluorimeter (Jenway 6280).

1. Calibration Based Upon Number of Deposits

The plastic rectangles were compared with water sensitive papers cut to the same size.

The plastic squares and water sensitive papers (WSPs) were positioned side by side in an alternating sequence and then sprayed. The deposits on the WSPs were analysed using a RGB camera and the subsequent images processed using ImageJ.

FIG. 10 shows the correlation between the number of deposits and the measured relative fluorescence units (RFU) of the wash-off. The sprayed samples were separated by the size of the deposits based on the American Society of Agricultural and Biological Engineers (ASABE) S572.1 definition of droplet size classification, this is reproduced in table 4.

TABLE 4

| Droplet size classification | |
|---|---|
| Spray Quality | VMD Range* (μm) |
| Extremely Fine | <60 |
| Very Fine | 61-105 |
| Fine | 106-235 |
| Medium | 236-340 |
| Coarse | 341-403 |
| Very Coarse | 404-502 |
| Extremely Coarse | 503-665 |
| Ultra Coarse | >665 |

*VMD is the droplet size at which 50% of the spray volume is in droplets larger than the VMD and 50% of the volume is in droplets smaller than the VMD.

It is noted that calibration for number of deposits was achieved but image analysis was too CPU intensive to allow the number of deposits to be recorded using the hardware in the handheld device. Furthermore, spray deposits in the field coalesce and therefore a count of deposits would not be useful. However, the analysis could be conducted using a computer with a superior CPU, and might be useful in some situations.

2. Calibration Based Upon Percentage Cover

For this experiment, the plastic squares were grouped together depending upon the rotation speed of the sprayer. It was found that varying the rotation speed varied the size of the droplets, as shown in table 5.

TABLE 5

| Correlation between rotation speed of sprayer and droplet size | | |
|---|---|---|
| FIG. | RPM | Approximate diameter of deposits (μm) |
| 11A | 1142 | 400-600 |
| 11B | 1958 | 250-500 |
| 11C | 4001 | 100-400 |
| 11D | 7840 | 80-200 |
| 11E | 12170 | 60-180 |
| 11F | 16254 | 40-160 |

Accordingly, when the deposits had a diameter approximately between 400 and 650 μm up to 0.06 μl of the tracer was deposited on the slide and only about 25% coverage was obtained, as shown in FIG. 11A. Note the values given provide the volume of the tracer composition on the slide, rather than the total volume of liquid. As explained above, the liquid on the slides is a 2% v/v solution of the tracer in deionised water. Accordingly, if 0.06 μl of the tracer was deposited on the slide, it will be appreciated that this corresponds to a total volume of 3 μl of liquid having been deposited.

Meanwhile, FIG. 11F shows the percentage coverage for deposits with a diameter between 40-160 μm. As shown in the Figure, almost 100% coverage was obtained with only about 0.02-0.03 μl of the tracer formulation (1-1.5 μl total liquid) having been deposited. The reason for this discrepancy is that larger diameter droplets are thicker than smaller droplets, and so deposit the same amount of tracer/liquid on a smaller surface area.

As shown in FIG. 11, if the size of the droplets is kept constant then there is a strong correlation between percentage cover and the amount of the tracer deposited. Accordingly, if the size of the droplets and the percentage cover was known, it would be possible to calculate the amount of the tracer deposited.

3. Calibration Based Upon Fluorescence

For fluorescent images, fluorescence can be measured in bit values (pixel brightness). Accordingly, images obtained using the handheld fluorimeter were analysed and the mean bit value/mm$^2$ calculated, the results are shown in FIG. 12. As shown in the Figure, there is a strong correlation between the volume of the tracer measured and the mean bit value/mm$^2$.

FIG. 12 shows the rotation speed of the sprayer used to produce the different droplets, and this corresponds to droplet size as explained above. For droplets of different sizes there is a small difference in the relationship between fluorescence values and the volume of liquid on the measured surface. However, this difference is slight, and the linear relationship between fluorescence value and volume of liquid, ignoring droplet size, has an R$^2$ value of 0.72, meaning that fluorescence value explains over 70% of the measure of volume of tracer.

Furthermore, if the largest droplets with an approximate diameter between 400-600 μm are removed, then the linear relationship between fluorescence value and volume of liquid has an R$^2$ value of 0.782. It is noted that the largest size droplets are rare in agricultural spraying, and often shatter into smaller droplets when they hit a plant surface.

As explained in example 1, the degree of fluorescence will vary depending upon the pesticide used. Accordingly, to ensure accuracy, it is important to measure the fluorescence of a sample comprising the pesticide and the tracer. This measurement can then be used to calibrate the measurements obtained in the field.

EXAMPLE 6—WORKED EXAMPLES

The inventors worked with over 20 growers to conduct 151 assessments over a two year period. These spray assessments were conducted on 19 crop types and tested a wide variety of spray variables. In particular, the inventors tested the tracer composition on baby red leaf lettuce, baby leaf spinach, iceberg lettuce, field peas, field beans, celery, brown onion, asparagus, sweetcorn, potatoes, baby gem lettuce, cherry trees, pear trees raspberry plants, grape vines, broccoli, strawberries and apple trees.

Results of the spray coverage analysis were highly variable between crops, spray settings and conditions. Typically high levels of spray deposit coverage were observed on the upper leaf surface but very low or zero coverage was observed on the lower leaf surface particularly at the bottom of the canopy. The growers were surprised at some of the low spray coverage recorded in parts of the canopy.

Results for specific trials are provided below. In all cases, spray deposition was conducted using standard industry practices. The spray deposit coverage was determined based upon the percentage coverage, as described in example 5.2.

1. Broccoli Trials

Figure 13:
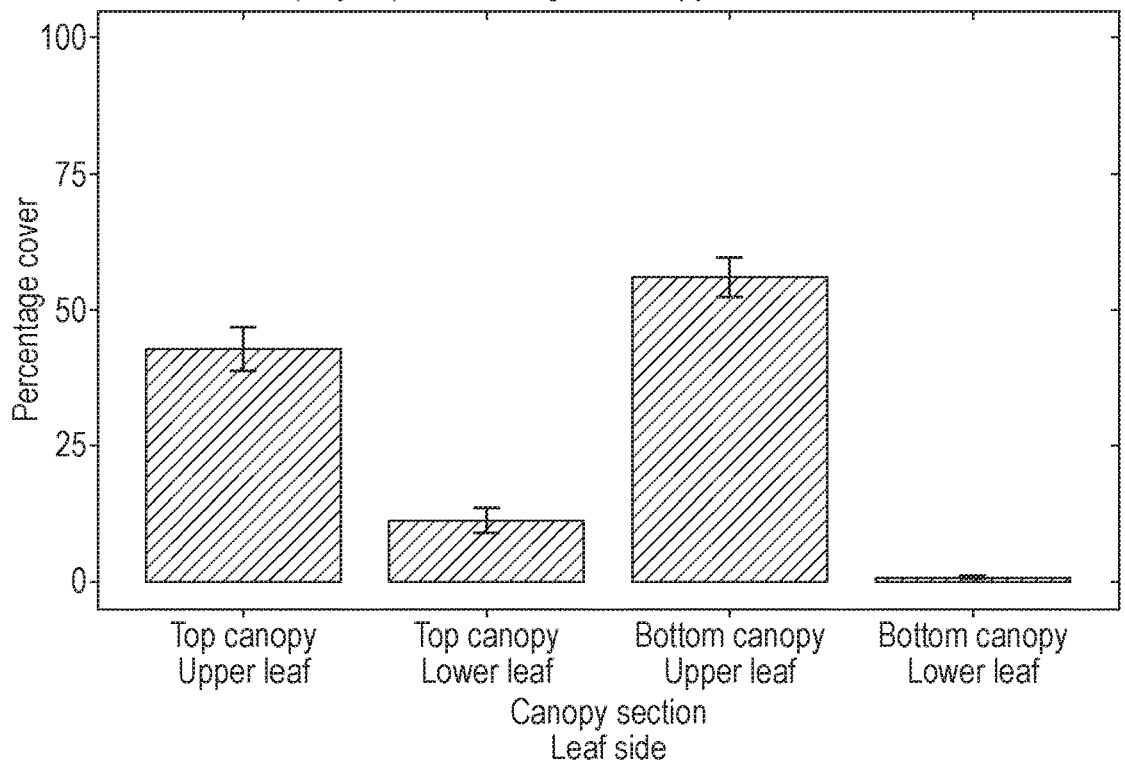
FIG. 13 is a graph showing spray deposit coverage in canopy zones on broccoli.

Broccoli plants were sprayed with an aqueous solution comprising FMN-Na. As shown in FIG. 13, it was found that spray deposit coverage was between 40% and 60% on the upper surface of the broccoli leaves. Conversely, on the lower surface of the broccoli leaves coverage was only between 1% and 11%. The main insect pests of broccoli colonise the underside of leaves.

Accordingly, the low coverage was identified as being problematic and alternative spray methods can now be investigated.

2. Strawberry Trials

The inventors also assessed the spray coverage of strawberries sprayed with three different adjuvants commonly used as 'wetting agents' in horticulture. All of the solutions prepared comprised FMN-Na. A control solution did not contain any adjuvant, while the remaining solutions comprised commercially available wetting agents at the concentrations recommended by the manufacturers.

Figure 14:
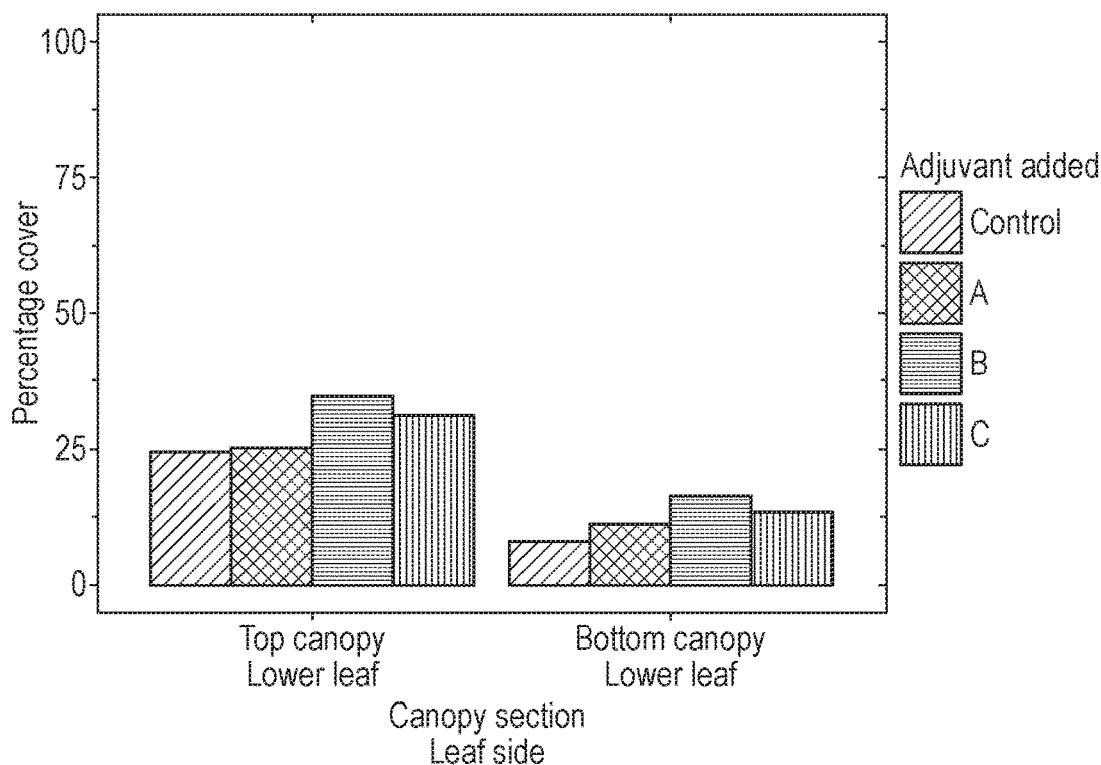
FIG. 14 is a graph showing spray deposit coverage on the lower leaf side of strawberry plants with different wetters.

It was found that in areas with high spray coverage (e.g. the upper side of the leaf), the effect of wetting agents was minimal. However, as shown in FIG. 14, in areas with lower coverage (e.g. the lower side of the leaf) wetting agents improved spray cover significantly. In particular, it is noted that commercially available wetting agent B doubled the coverage of the lower leaf in the bottom canopy compared to the control.

Accordingly, using the tracer formulation and methods described above, the growers can select the best wetting agents for a given application, ensuring better coverage.

3. Apple Trials

A Kentish apple grower was experiencing significant mildew disease on their apple crop and faced a risk of large economic loss. The grower had contacted an agronomist for advice who suggested there might be an issue with the spray machine which was used to apply the pesticide to the apple trees. However, the grower insisted that the spraying had been done satisfactorily.

The apple trees were planted in a three row bed. An aqueous solution comprising 2 wt % FMN-Na was applied to the apple trees using the apple grower's normal spraying system, using the same settings and rates as the grower would normally use when applying pesticides. In particular, the spray machine was set up with a water rate of 400 l/ha. The trees where then imaged and the images were analysed as explained in examples 3 and 4.

Figure 15A:
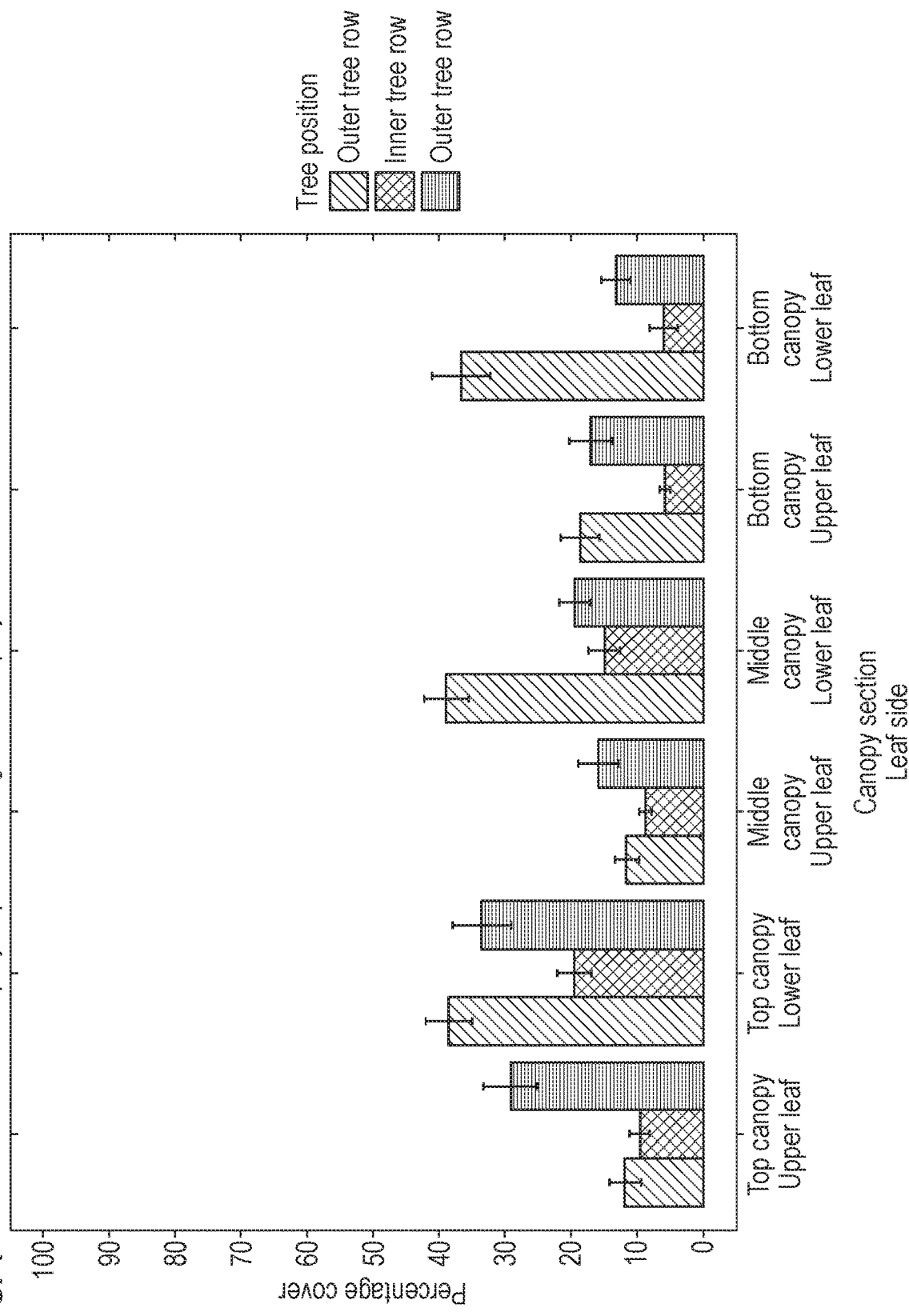
FIG. 15A is a graph showing spray deposition coverage of leaves on apple trees prior to sprayer modification.
Figure 15B:
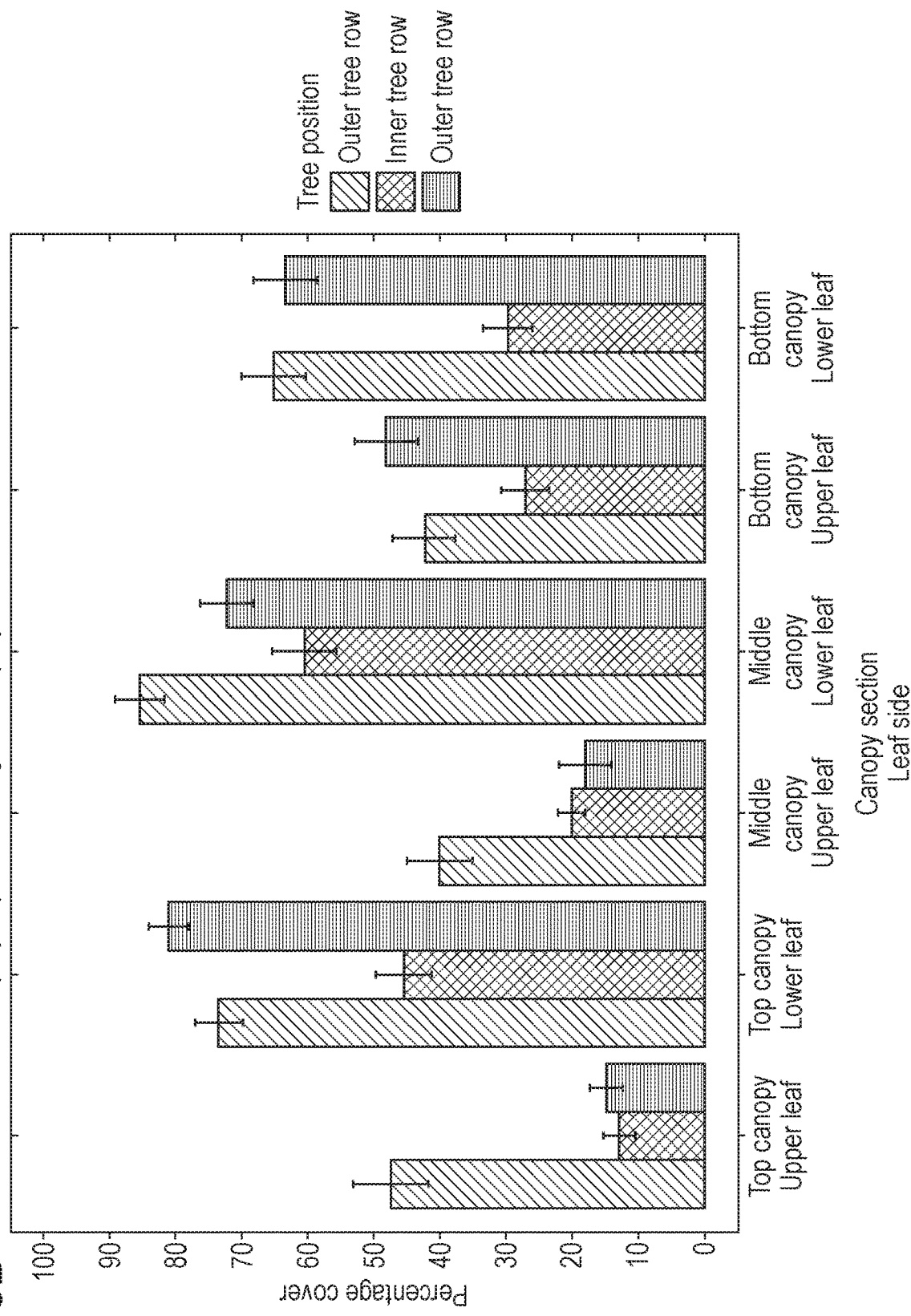
FIG. 15B is a graph showing spray deposition coverage of leaves on apple trees after sprayer modification.

Analysis of the images found that the sprayer was underspraying the trees. FIG. 16A shows the results of measuring spray coverage across the three-row bed of trees at various sections of the tree canopy. The spray coverage across the trees was highly variable and very low. In particular, it was shown that the inner row of trees had especially low spray coverage, but many other areas also displayed below 20% spray coverage, see FIG. 15A. Upon calibrating the spray machine it was discovered that it was actually spraying at 370 l/ha, rather than 400 l/ha as intended, which would be one cause of the low spray coverage. It was thought that a further cause of the low spray coverage and the variability, at least in part, was the old nozzles on the sprayer.

Due to these results, the nozzles on the sprayer were replaced and 3 nozzle outlets were added to provide a more encompassing spray plume. As shown in FIG. 15B, the spray coverage was significantly improved after modification of the sprayer. Furthermore, this improved coverage was achieved using a lower volume of water (300 l/ha) leading to significant cost savings for the grower. Due to the modification in the sprayer, the grower's apple crop was saved.

CONCLUSION

The inventors have developed a food safe tracer composition which is compatible with a wide range of pesticides and crops. Furthermore, the composition can be used on crops without crop destruction, and is safe to humans and the environment.

By using the composition it is possible to ascertain the spray deposition achieved when a pesticide is applied to a plant. Advantageously, the inventors have shown that analysis of the data also allows the amount of pesticide deposited to be quantified.

The invention claimed is:

1. A food safe tracer composition, the composition comprising:

(i) a food safe fluorescent molecule which fluoresces when exposed to an excitation wavelength, and thereby emits a photon with a wavelength between 400 and 600 nm, wherein the food safe fluorescent molecule is a compound of formula (I):

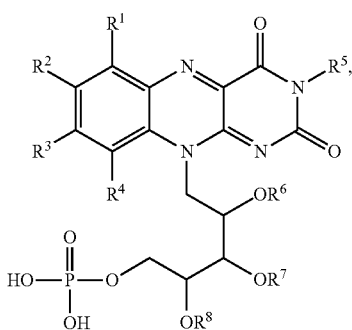

wherein each of $R^1$ to $R^8$ is independently hydrogen or a $C_{1-5}$ alkyl, or a salt and/or solvate thereof;

(ii) a stabilizing agent configured to improve the photostability of the fluorescent molecule, wherein the stabilizing agent comprises thiosulfuric acid or a salt and/or solvate thereof or a compound of formula (II):

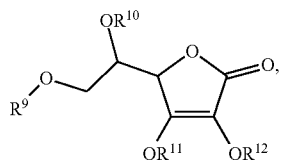

wherein each of $R^9$ to $R^{12}$ is independently hydrogen or a $C_{1-5}$ alkyl or a salt and/or solvate thereof; and (iii) a gelling agent, wherein the gelling agent comprises a saccharide and an alcohol, and the weight ratio of the saccharide to the alcohol is between 1:10 and 10:1.

2. The tracer composition according to claim 1, wherein the fluorescent molecule emits a photon with a wavelength between 500 and 600 nm.

3. The tracer composition according to claim 1, wherein the fluorescent molecule fluoresces when exposed to an excitation wavelength between 150 and 700nm, optionally wherein the fluorescent molecule fluoresces when exposed to an excitation wavelength between 465 and 500 nm.

4. The tracer composition according to claim 1, wherein the fluorescent molecule riboflavin 5'-monophosphate or a salt and/or solvate thereof.

5. The tracer composition according to claim 1, wherein the tracer composition comprises:

the florescent molecule at a concentration between 0.0001 and 50 wt %, between 0.001and 50 wt %, between 0.005 and 10 wt %, between 0.01 and 1 wt %, between 0.02 and 0.8 wt %, between 0.04 and 0.6 wt %, between 0.06 and 0.4 wt % or between 0.08 and 0.2 wt %; and/or the gelling agent at a concentration of between 10 and 99 wt %, between 20 and 95 wt %, between 30 and 90 wt %, between 40 and 85 wt %, between 50 and 80 wt %, between 60 and 77.5wt %, between 65 and 75 wt % or between 67.5 and 72.5 wt %.

6. The tracer composition according to claim 1, wherein the saccharide is a disaccharide, or a salt and/or solvate thereof, optionally wherein the disaccharide is sucrose, or a salt and/or solvate thereof.

7. The tracer composition according to claim 1, wherein the weight ratio of the saccharide to the alcohol is between 5:1 and 1:5, between 1:4 and 4:1, between 1:3 and 3:1, between 1:2 and 2:1, between 1.75:1 and 1:1, between 1.5:1 and 1.1:1 or between 1.3:1 and 1.2:1.

8. The tracer composition according to claim 1, wherein the stabilizing agent absorbs photons with a wavelength between 100 and 500 nm, between 150 and 400 nm, between 175 and 350 nm or between 200 and 325 nm, optionally wherein the tracer composition comprises the stabilizing agent at a concentration of between 0.01 and 90 wt %, between 0.1 and 50 wt %, between 0.5 and 30 wt %, between 1 and 10 wt %, between 2 and 7.5 wt %, between 2.5 and 5 wt %, between 3 and 4.5 wt % or between 3.5 and 4 wt %.

9. The tracer composition according to claim 1, wherein the stabilizing agent comprises a compound of formula (II):

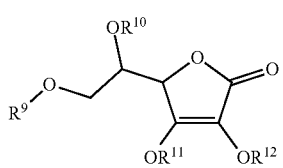

wherein each of $R^9$ to $R^{12}$ is independently hydrogen or a $C_{1-5}$ alkyl, or a salt and/or solvate thereof, optionally wherein the stabilizing agent comprises ascorbic acid, or a salt and/or solvate thereof.

10. The tracer composition according to claim 1, wherein the tracer composition comprises a solvent, which preferably comprises water.

11. A plant protection composition comprising:
the tracer composition of claim 1; and
a plant protection product (PPP).

12. The plant protection composition according to claim 11, wherein the PPP comprises a herbicide, an insecticide, an acaricide, a nematicide, a molluscicide, a bactericide and/or a fungicide, and/or wherein the plant protection composition comprises the tracer composition in an amount which is between 0.01 and 50% (v/v), between 0.1 and 40% (v/v), between 0.25 and 30% (v/v), between 0.5 and 20% (v/v), between 0.75 and 10% (v/v) or between 1 and 5% (v/v), and/or wherein the plant protection composition comprises the PPP in an amount which is between 20 and 99.99% (v/v), between 60 and 99.9% (v/v), between 40 and 99.9% (v/v), between 90 and 99% (v/v) or between 95 and 99% (v/v).

13. An apparatus comprising:
a dual wavelength light emitting device to selectively illuminate a surface at a first wavelength and to selectively illuminate the surface at a second wavelength, wherein the surface has a material thereon and wherein the first wavelength is in the range of 400 to 500 nm and the second wavelength is in the range of 500 to 600 nm;

a camera sensor for generating a first fluorescence image in response to the illumination of said surface at the first wavelength and a first visual image in response to the illumination of said surface at the second wavelength; and a processor configured to process the first visual image to generate a mask indicative of an area of the first visual image; generate a second fluorescence image by masking the first fluorescence image using the mask; and process the second fluorescence image to determine a coverage information and/or a dosage information of said material.

14. An apparatus according to claim 13, wherein the light emitting device comprises at least one light emitting diode, optionally wherein each of said at least one light emitting diodes is placed in a back focal plane of said light emitting device to provide a uniform pattern of light to illuminate said surface.

15. An apparatus according to claim 13, wherein the light emitting device further comprises at least one of:
   a first planoconvex lens;
   at least one emission filter; and
   a second planoconvex; and/or
wherein the surface comprises a plant or a part thereof.

16. A method comprising:
   selectively illuminating a surface at a first wavelength, wherein the surface has a material thereon and the first wavelength is in the range of 400 to 500 nm;
   generating a first fluorescence image of said surface in response to the illumination at the first wavelength;
   selectively illuminating the surface at a second wavelength, wherein the second wavelength is in the range of 500 to 600 nm;
   generating a first visual image of said surface in response to the illumination at the second wavelength;
   processing the first visual image to generate a mask indicative of an area of the first visual image;
   generating a second fluorescence image by masking the first fluorescence image using the mask; and
   processing the second fluorescence image to determine a coverage information and/or a dosage information of said material.

17. A method according to claim 16, wherein the material is the tracer composition defined by claim 1.

18. A method according to claim 16, wherein the method further comprises:
   generating a plurality of candidate first fluorescence images at different illumination intensities; and
   selecting one of said plurality candidate first fluorescence images as said first fluorescence image.

* * * * *